US010095191B2

(12) United States Patent
Heo et al.

(10) Patent No.: US 10,095,191 B2
(45) Date of Patent: Oct. 9, 2018

(54) METHOD OF OUTPUTTING ALARM AND ELECTRONIC DEVICE SUPPORTING THE SAME

(71) Applicant: Samsung Electronics Co., Ltd, Gyeonggi-do (KR)

(72) Inventors: Chang Ryong Heo, Gyeonggi-do (KR); Dong Il Son, Gyeonggi-do (KR); Chi Hyun Cho, Gyeonggi-do (KR); Jae Seok Joo, Gyeonggi-do (KR); Hee Yeon Jeong, Seoul (KR); Jung Su Ha, Gyeonggi-do (KR); Mi Jeong Song, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/368,550

(22) Filed: Dec. 2, 2016

(65) Prior Publication Data

US 2017/0160703 A1    Jun. 8, 2017

(30) Foreign Application Priority Data

Dec. 4, 2015   (KR) .................. 10-2015-0172555

(51) Int. Cl.
| | |
|---|---|
| *G08B 21/22* | (2006.01) |
| *G04G 13/02* | (2006.01) |
| *G06K 9/00* | (2006.01) |
| *G04G 21/02* | (2010.01) |
| *G08B 5/36* | (2006.01) |
| *H04W 64/00* | (2009.01) |
| *H04W 4/02* | (2018.01) |
| *G08B 21/00* | (2006.01) |

(Continued)

(52) U.S. Cl.
CPC .......... *G04G 13/021* (2013.01); *G04G 21/025* (2013.01); *G06K 9/00255* (2013.01); *G06K 9/00288* (2013.01); *G08B 21/22* (2013.01); *G08B 5/36* (2013.01); *G08B 5/38* (2013.01); *G08B 6/00* (2013.01); *G08B 13/19656* (2013.01); *G08B 21/00* (2013.01); *G08B 21/0258* (2013.01); *G08B 21/18* (2013.01); *G08B 21/24* (2013.01); *H04W 4/02* (2013.01); *H04W 4/021* (2013.01); *H04W 4/025* (2013.01); *H04W 64/00* (2013.01)

(58) Field of Classification Search
CPC ....... H04W 4/02; H04W 4/021; H04W 4/025; H04W 64/00; G08B 21/00; G08B 21/18; G08B 21/24; G08B 13/19656; G08B 25/14; G08B 21/0258; G08B 27/00; G08B 5/36; G08B 5/38; G08B 6/00
See application file for complete search history.

(56) References Cited

U.S. PATENT DOCUMENTS

| | | | | |
|---|---|---|---|---|
| 2011/0189977 A1* | 8/2011 | Woen | .................... | G06Q 10/109 455/412.1 |
| 2012/0293323 A1* | 11/2012 | Kaib | .................... | G06F 19/3418 340/539.12 |
| 2014/0293755 A1* | 10/2014 | Geiser | .................... | G04B 19/24 368/12 |

* cited by examiner

*Primary Examiner* — Benyam Haile

(57) ABSTRACT

Disclosed is a method of outputting an alarm, the method being performed by an electronic device, the method including receiving a request for setting a schedule, from at least one user, storing identification information and schedule execution information on the at least one user, and tracking a target user of the schedule. If an alarm execution time included in the schedule execution information comes, the method further includes providing an alarm related to the schedule to the target user in a specific manner.

20 Claims, 17 Drawing Sheets

(51) Int. Cl.
*G08B 5/38* (2006.01)
*G08B 6/00* (2006.01)
*G08B 13/196* (2006.01)
*G08B 21/18* (2006.01)
*G08B 21/02* (2006.01)
*G08B 21/24* (2006.01)
*H04W 4/021* (2018.01)

METHOD OF OUTPUTTING ALARM AND ELECTRONIC DEVICE SUPPORTING THE SAME

CROSS-REFERENCE TO RELATED APPLICATION(S) AND CLAIM OF PRIORITY

The present application is related to and claims the benefit under 35 U.S.C. § 119(a) of a Korean patent application filed on Dec. 4, 2015 in the Korean Intellectual Property Office and assigned Serial number 10-2015-0172555, the entire disclosure of which is hereby incorporated by reference.

TECHNICAL FIELD

The present disclosure relates to an alarm output method that may store a schedule and provide the user with an alarm based on the schedule, and an electronic device supporting the same.

BACKGROUND

In recent years, electronic devices for homes and offices that may perform various functions have been developed and used. Such an electronic device may be used by a plurality of users in a specific space. The electronic device may recognize voices or operations of the plurality of users, and may perform a voice communication with a user or may perform a command requested by the user, based on the recognized information.

However, in the alarm output method according to the related art a set alarm may be broadcast to all the users in the same space so that persons other than an alarm target may unnecessarily perceive the alarm.

SUMMARY

To address the above-discussed deficiencies, it is a primary object to provide an electronic device that may store identification information of a plurality of users and schedules of users in conjunction, and may allow a user who is a target of an alarm based on the stored schedule to recognize the alarm.

In accordance with an aspect of the present disclosure, there is provided a method of outputting an alarm, the method being performed by an electronic device, the method including receiving a request for setting a schedule, from at least one user, storing identification information and schedule execution information on the user, tracking a target user of the schedule, and if an alarm execution time included in the schedule execution information comes, providing an alarm related to the schedule to the target user in a specific manner.

Other aspects, advantages, and salient features of the disclosure will become apparent to those skilled in the art from the following detailed description, which, taken in conjunction with the annexed drawings, discloses various embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, it should be noted that like reference numbers are used to depict the same or similar elements, features, and structures.

DETAILED DESCRIPTION

Figure 1:
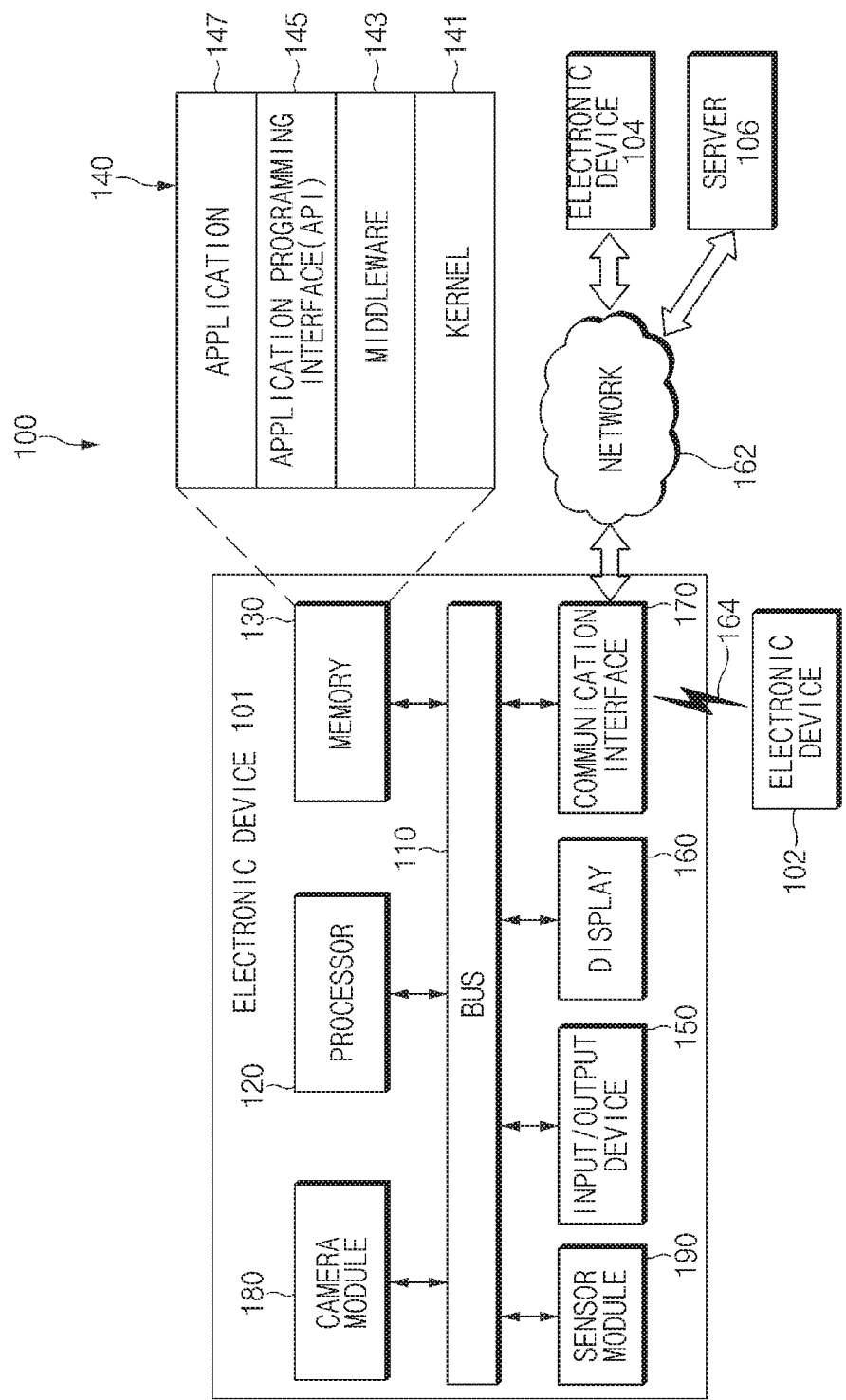
FIG. 1 illustrates an electronic device in a network environment according to various embodiments.

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Hereinafter, various embodiments of the present disclosure will be described with reference to the accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar components may be marked by similar reference numerals.

In the disclosure disclosed herein, the expressions "have", "may have", "include" and "comprise", or "may include" and "may comprise" used herein indicate existence of corresponding features (for example, elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the present disclosure, but do not limit the elements. For example, such terms are used only to distinguish an element from another element and do not limit the order and/or priority of the elements. For example, a first user device and a second user device may represent different user devices irrespective of sequence or importance. For example, without departing the scope of the present disclosure, a first element may be referred to as a second element, and similarly, a second element may be referred to as a first element.

It will be understood that when an element (for example, a first element) is referred to as being "(operatively or communicatively) coupled with/to" or "connected to" another element (for example, a second element), it can be directly coupled with/to or connected to the other element or an intervening element (for example, a third element) may be present. In contrast, when an element (for example, a first element) is referred to as being "directly coupled with/to" or "directly connected to" another element (for example, a second element), it should be understood that there are no intervening element (for example, a third element).

According to the situation, the expression "configured to" used herein may be used as, for example, the expression "suitable for", "having the capacity to", "designed to", "adapted to", "made to", or "capable of". The term "configured to (or set to)" must not mean only "specifically designed to" in hardware. Instead, the expression "a device configured to" may mean that the device is "capable of" operating together with another device or other components. CPU, for example, a "processor configured to (or set to) perform A, B, and C" may mean a dedicated processor (for example, an embedded processor) for performing a corresponding operation or a generic-purpose processor (for example, a central processing unit (CPU) or an application processor) which may perform corresponding operations by executing one or more software programs which are stored in a memory device.

Terms used in this specification are used to describe specified embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include at least one of smart-phones, tablet personal computers (PCs), mobile phones, video telephones, electronic book readers, desktop PCs, laptop PCs, netbook computers, workstations, servers, personal digital assistants (PDAs), portable multimedia players (PMPs), MP3 players, mobile medical devices, cameras, and wearable devices. According to various embodiments of the present disclosure, the wearable devices may include accessories (for example, watches, rings, bracelets, ankle bracelets, glasses, contact lenses, or head-mounted devices (HMDs)), cloth-integrated types (for example, electronic clothes), body-attached types (for example, skin pads or tattoos), or implantable types (for example, implantable circuits).

In some embodiments of the present disclosure, the electronic device may be one of home appliances. The home appliances may include, for example, at least one of a digital video disk (DVD) player, an audio, a refrigerator, an air conditioner, a cleaner, an oven, a microwave oven, a washing machine, an air cleaner, a set-top box, a home automation control panel, a security control panel, a TV box (for example, Samsung HomeSync™, Apple TV™, or Google TV™), a game console (for example, Xbox™ or PlayStation™), an electronic dictionary, an electronic key, a camcorder, or an electronic panel.

In another embodiment of the present disclosure, the electronic device may include at least one of various medical devices (for example, various portable medical measurement devices (a blood glucose meter, a heart rate measuring device, a blood pressure measuring device, and a body temperature measuring device), a magnetic resonance angiography (MRA), a magnetic resonance imaging (MM) device, a computed tomography (CT) device, a photographing device, and an ultrasonic device), a navigation system, a global navigation satellite system (GNSS), an event data recorder (EDR), a flight data recorder (FDR), a vehicular infotainment device, electronic devices for vessels (for example, a navigation device for vessels and a gyro compass), avionics, a security device, a vehicular head unit, an industrial or home robot, an automatic teller's machine (ATM) of a financial company, a point of sales (POS) of a store, or an internet of things (for example, a bulb, various sensors, an electricity or gas meter, a spring cooler device, a fire alarm device, a thermostat, an electric pole, a toaster, a sporting apparatus, a hot water tank, a heater, and a boiler).

According to some embodiments of the present disclosure, the electronic device may include at least one of a furniture or a part of a building/structure, an electronic board, an electronic signature receiving device, a projector, or various measurement devices (for example, a water service, electricity, gas, or electric wave measuring device). In various embodiments of the present disclosure, the electronic device may be one or a combination of the aforementioned devices. The electronic device according to some embodiments of the present disclosure may be a flexible electronic device. Further, the electronic device according to an embodiment of the present disclosure is not limited to the aforementioned devices, but may include new electronic devices produced due to the development of technologies.

Hereinafter, electronic devices according to an embodiment of the present disclosure will be described with reference to the accompanying drawings. The term "user" used herein may refer to a person who uses an electronic device or may refer to a device (for example, an artificial electronic device) that uses an electronic device.

FIG. 1 illustrates an electronic device 101 in a network environment 100 according to various embodiments.

FIG. 1 is a diagram illustrating an electronic device in a network environment, according to various embodiments.

Referring to FIG. 1, there is illustrated an electronic device 101 in a network environment 100 according to various embodiments. The electronic device 101 may include a bus 110, a processor 120, a memory 130, an input/output (I/O) interface 150, a display 160, and a communication interface 170. According to an embodiment, the electronic device 101 may not include at least one of the above-described elements or may further include other element(s).

For example, the bus 110 may interconnect the above-described elements 120 to 170 and may include a circuit for conveying communications (e.g., a control message and/or data) among the above-described elements.

The processor 120 may include one or more of a central processing unit (CPU), an application processor (AP), or a communication processor (CP). The processor 120 may perform, for example, data processing or an operation associated with control and/or communication of at least one other element(s) of the electronic device 101.

The memory 130 may include a volatile and/or nonvolatile memory. For example, the memory 130 may store instructions or data associated with at least one other element(s) of the electronic device 101. According to an embodiment, the memory 130 may store software and/or a program 140. The program 140 may include, for example, a kernel 141, a middleware 143, an application programming interface (API) 145, and/or an application program (or "application") 147. At least a part of the kernel 141, the middleware 143, or the API 145 may be called an "operating system (OS)".

The kernel 141 may control or manage system resources (e.g., the bus 110, the processor 120, the memory 130, and the like) that are used to execute operations or functions of other programs (e.g., the middleware 143, the API 145, and the application program 147). Furthermore, the kernel 141 may provide an interface that allows the middleware 143, the API 145, or the application program 147 to access discrete elements of the electronic device 101 so as to control or manage system resources.

The middleware 143 may perform a mediation role such that the API 145 or the application program 147 communicates with the kernel 141 to exchange data.

Furthermore, the middleware 143 may process one or more task requests received from the application program 147 according to a priority. For example, the middleware 143 may assign the priority, which makes it possible to use a system resource (e.g., the bus 110, the processor 120, the memory 130, or the like) of the electronic device 101, to at least one of the application program 147. For example, the middleware 143 may process the one or more task requests according to the priority assigned to the at least one, which makes it possible to perform scheduling or load balancing on the one or more task requests.

The API 145 may be an interface through which the application 147 controls a function provided by the kernel 141 or the middleware 143, and may include, for example, at least one interface or function (e.g., an instruction) for a file control, a window control, image processing, a character control, or the like.

The I/O interface 150 may transmit an instruction or data, input from a user or another external device, to other element(s) of the electronic device 101. Furthermore, the I/O interface 150 may output an instruction or data, received from other element(s) of the electronic device 101, to a user or another external device.

The display 160 may include, for example, a liquid crystal display (LCD), a light-emitting diode (LED) display, an organic LED (OLED) display, or a microelectromechanical systems (MEMS) display, or an electronic paper display. The display 160 may display, for example, various kinds of content (e.g., a text, an image, a video, an icon, a symbol, and the like) to a user. The display 160 may include a touch screen and may receive, for example, a touch, gesture, proximity, or hovering input using an electronic pen or a portion of a user's body.

The communication interface 170 may establish communication between the electronic device 101 and an external device (e.g., a first external electronic device 102, a second external electronic device 104, or a server 106). For example, the communication interface 170 may be connected to a network 162 through wireless communication or wired communication to communicate with an external device (e.g., the second external electronic device 104 or the server 106).

The wireless communication may include at least one of, for example, LTE (long-term evolution), LTE-A (LTE Advance), CDMA (Code Division Multiple Access), WCDMA (Wideband CDMA), UMTS (Universal Mobile Telecommunications System), WiBro (Wireless Broadband), or GSM (Global System for Mobile Communications), or the like, as cellular communication protocol. Furthermore, the wireless communication may include, for example, a local area network 164. The local area network 164 may include at least one of a wireless fidelity (Wi-Fi), a near field communication (NFC), or a global navigation satellite system (GNSS), or the like. The GNSS may include at least one of a global positioning system (GPS), a global navigation satellite system (Glonass), Beidou Navigation Satellite System (hereinafter referred to as "Beidou"), the European global satellite-based navigation system (Galileo), or the like. In this specification, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 162 may include at least one of telecommunications networks, for example, a computer network (e.g., LAN or WAN), an Internet, or a telephone network.

A camera module 180 may capture a peripheral image of the electronic device 101. The image captured through the camera module 180 may be used to recognize a peripheral object. For example, the camera module 180 may include a 2D camera (for example, an RGB camera or a DVS) and a 3D camera (for example, a depth camera). In various embodiments the camera module 180 may be used to identify the user who uses the electronic device 101. For example, the camera module 180 may be used to recognize a part (for example, the face, a hand, or a foot) of the body of the user.

A sensor module 190 may acquire at least one piece of information on an external environment. The sensor module 190 may be used to recognize a change (for example, in an inclination or a speed) of the electronic device 101 or a change (for example, a change in a temperature or a humidity) of the surrounding environment. The sensor module 190 may collect body information (for example, a fingerprint, an iris, a vein, a heart rate, a respiration, a body temperature, or a body odor) of the user, and may recognize an approach of the user.

Each of the first and second external electronic devices 102 and 104 may be a device of which the type is different from or the same as that of the electronic device 101. According to an embodiment, the server 106 may include a group of one or more servers. According to various embodiments, all or a portion of operations that the electronic device 101 will perform may be executed by another or plural electronic devices (e.g., the electronic devices 102 and 104 or the server 106). According to an embodiment, in the case where the electronic device 101 executes any function or service automatically or in response to a request, the electronic device 101 may not perform the function or the service internally, but, alternatively additionally, it may request at least a part of a function associated with the electronic device 101 at other device (e.g., the electronic device 102 or 104 or the server 106). The other electronic device (e.g., the electronic device 102 or 104 or the server 106) may execute the requested function or additional function and may transmit the execution result to the electronic device 101. The electronic device 101 may provide the requested function or service using the received result or may additionally process the received result to provide the requested function or service. To this end, for example, cloud computing, distributed computing, or client-server computing may be used.

Figure 2:
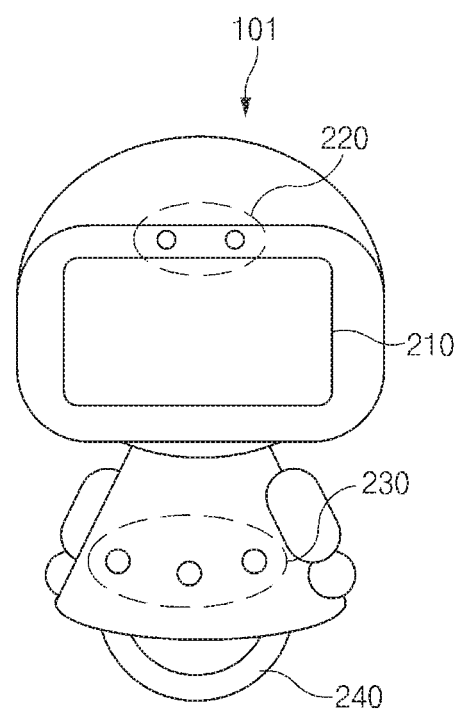
FIG. 2 illustrates external configurations of an electronic device according to various embodiments.

FIG. 2 illustrates external configurations of an electronic device according to various embodiments. FIG. 2 is simply exemplary, and the present disclosure is not limited thereto.

Referring to FIG. 2, the electronic device 101 may include a display 210, a camera module 220, an input button 230, and a moving part 240 on the outside thereof. FIG. 2 illustrates main external configurations, and other configurations (for example, a microphone) may be additionally mounted.

The display 210 may display various contents (for example, a text, an image, a video, an icon, or a symbol) that are provided to the user. The display 210 may be implemented by a touch screen to recognize a touch input of the user. The display 210 may display a schedule that is stored by the user, or may output a popup that is related to the schedule stored by the user.

A camera module 220 may capture a peripheral image of the electronic device 101. The image captured through the camera module 220 may be used to recognize a peripheral object. In various embodiments, the camera module 220 may be implemented by a depth camera to recognize a three-dimensional shape of a peripheral object. For example, the camera module 220 may be used to photograph a part (for example, a face, a hand, or a foot) of the body of the user, and may collect key point information of the part of the body. The collected key point information may be delivered to a processor 120 to be used to recognize the user. Further, the key point information may be stored in a memory 130, and may be stored as key point information of the user.

The input button 230 may perform an interface for manipulating the electronic device 101. For example, the input button 230 may include a power button, a volume button, and a function button.

The moving part 240 may allow the electronic device 101 to move around. For example, the moving part 240 may include a motor that receives electric power through an internal battery, and may include wheels that are rotated by using a force generated by the motor. As another example, the moving part 240 may be implemented in the form of legs of a bipedal robot.

In various embodiments, the electronic device 101 may further include a microphone or a speaker, at least a portion of which is exposed to the outside. The microphone and the speaker may be arranged on a side on which the display 210 is arranged. The microphone may connect a voice of the user, and the speaker may output a sound that is provided to the user.

Figure 3:
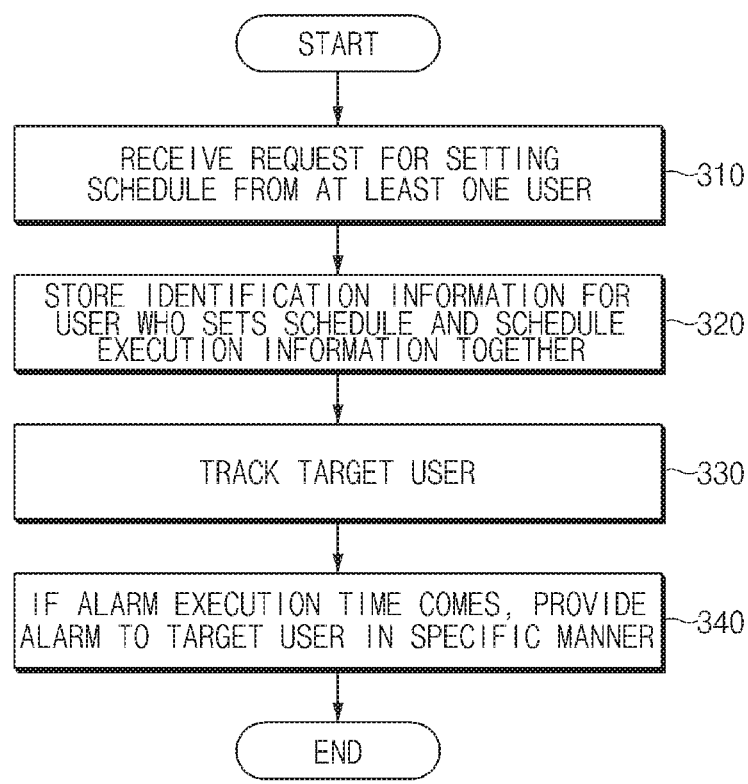
FIG. 3 is a flowchart illustrating a method of outputting an alarm according to various embodiments.

FIG. 3 is a flowchart illustrating a method of outputting an alarm according to various embodiments.

Referring to FIG. 3, in operation 310, the electronic device 101 may receive a request (hereinafter, a schedule setting request) for setting a schedule, from at least one user. In various embodiments, the electronic device 101 may be a device that is commonly used by one or more users. The electronic device 101 may be a domestic robot, and may be a device that may be used by all the members (for example, a grandmother, a grandfather, a mother, a father, and children) of a family. For example, the family members may request the electronic device 101 to make morning calls to wake up them at their desired times.

In various embodiments, the user may store a schedule in the electronic device 101 by using at least one of a button input, a motion input, a touch input, or a voice input. For example, when the user stores a morning call schedule through a voice, the electronic device 101 may identify whether the voice coincides with a voice of the user stored in advance (compare voice colors). When the voice coincides with the voice of the user, the electronic device 101 may convert and parse the voice of the user and may extract a morning call time.

In operation 320, the electronic device 101 may store identification information on the user (hereinafter, the setting user) who sets a schedule and information (hereinafter, schedule execution information) that is related to execution of a schedule.

Because the electronic device 101 may be a common device that may be used by different users, it may store schedule execution information together with identification information of the user who requested the electronic device 101 to set a schedule.

The schedule execution information may include information on at least one of a schedule type, an alarm execution time, or an alarm execution site. For example, when user 1 requests the electronic device 101 to set a morning call, the electronic device 101 may code and store <user 1, morning call, 6 a.m., alarm is executed at a point adjacent to a bed of room 2>.

In various embodiments, when an alarm execution site is not set in advance, the electronic device 101 may perform a process of inquiring the alarm execution site from the user through a popup window or a voice.

According to various embodiments the schedule execution information may further include information on an alarm execution type. The alarm execution type may include information on an alarm is to be executed by using an interworking peripheral device (for example, a smartwatch or a smart pillow) or through a direct stimulus (a sound, light, or a body stimulus) as information on a detailed method of executing an alarm based on a set schedule.

In operation 330, the electronic device 101 may track a user (hereinafter, a target user) who is a target of an alarm. The electronic device 101 may track a location of the target user to provide an alarm to the target user of a plurality of users at an alarm execution time. For example, when the user sets a morning call scheduled at night, the electronic device 101 may continuously track movement (for example, room 1->bathroom->living room) of the corresponding user until the set time. When the alarm execution site is changed, the electronic device 101 may update information on the alarm execution site. In various embodiments, the electronic device 101 may track the user until the alarm execution time included in the schedule execution information.

In operation 340, the electronic device 101 may provide an alarm to the target user in a specific manner if the alarm execution time comes.

According to various embodiments, the electronic device 101 may move to the alarm execution site included in the schedule execution information if the alarm execution time comes or is near. The electronic device 101 may move to the alarm execution site by using the moving part 240. In various embodiments, the electronic device 101 may make a preparation for executing an alarm (for example, 5 minutes) before the alarm execution time. For example, the electronic device 101 may move to the alarm execution site before the alarm execution time, and may search for a target user or determine a manner in which an alarm is executed.

In various embodiments, the electronic device 101 may identify the user through the camera module 180 or the sensor module 190, and may provide an alarm to the identified user.

In various embodiments, the electronic device 101 may provide an alarm by using an indirect or direct method. The indirect method may be a method of executing an alarm by using an interworking peripheral device (for example, a smartwatch or a smart pillow), and the direct method may be a method of executing an alarm by applying a direct stimulus (a sound, light, or a body stimulus) to the user.

Hereinafter, it will be mainly discussed that a morning call is set by using the electronic device 101 and an alarm is executed based on the morning call, but the present disclosure is not limited thereto.

Figure 4:
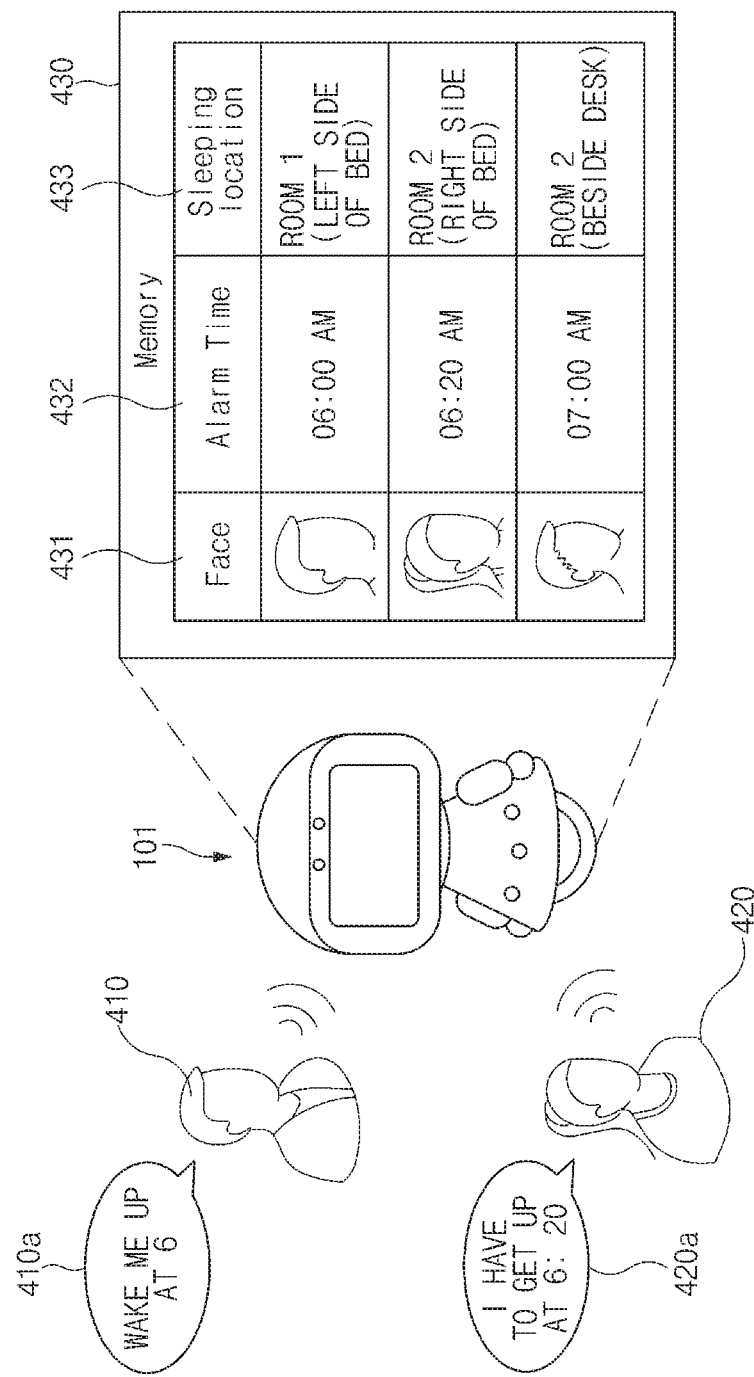
FIG. 4 is a diagram illustrating an example of storing schedules of a plurality of users according to various embodiments.

FIG. 4 is a diagram illustrating an example of storing schedules of a plurality of users according to various embodiments.

Referring to FIG. 4, the electronic device 101 may be a common device that may be used by a plurality of users. For example, the electronic device 101 may be a robot device that may be commonly used by the family members at home.

The electronic device 101 may be arranged in a common space (for example, a house or an office), and a plurality of users may use the electronic device 101. The plurality of users may set different schedules in the electronic device 101.

For example, the electronic device 101 may be commonly used by the family members at home, and the family members may set a morning call at their desired times. User A 410 may set a morning call 410a to 6:00 a.m. User B 420 may set a morning call 420a to 6:20 a.m.

In various embodiments, when the user requests setting of a schedule through a voice, the electronic device 101 may convert and parse the voice of the user, and may extract information on the schedule.

The electronic device 101 may store the schedules of the users in the form of a table 430. The schedule table 430 may store identification information 431 (for example, face recognition information) of the target users and schedule execution information 432 and 433 together.

Although FIG. 4 exemplarily illustrates that the schedule execution information 432 and 433 includes an alarm execution time 432 and an alarm execution site 433, the present disclosure is not limited thereto. For example, the schedule execution information 432 and 433 may further include information on a processing method in the case in which the alarm execution type or the target user cannot be recognized.

For example, when user A 410 requests the electronic device 101 to set a morning call, the electronic device 101 may store <identification information of user A—face recognition information, alarm execution time—6 a.m. sharp, alarm execution location—the left side of a bed of room 1>.

In various embodiments, when an alarm execution site is not set in advance, the electronic device 101 may perform a process of inquiring the alarm execution site from the user through a popup window or a voice.

In various embodiments, when setting of two or more schedules at the same time or within a specific range (for example, 5 minutes) is requested by another user, the electronic device 101 may inform the users that a preset schedule is present or it is impossible to set a schedule.

According to various embodiments, the electronic device 101 may store a specific attribute. For example, when the user requests setting of a morning call, the electronic device 101 may identify and store whether the alarm corresponds to a periodic alarm or a one-time alarm. When a one-time alarm is set, the electronic device 101 may not apply a periodic alarm of the day. Further, when a one-time alarm is repeated, the electronic device 101 may inquire whether the alarm is stored as a periodic alarm, from the user.

According to various embodiments, the electronic device 101 may store a conditional schedule that is based on a specific event. When a specific event is generated, the user may set an alarm to be made.

For example, user A may set an alarm to be made, if a sport game that begins at dawn starts. When receiving information on whether the sport game will start from an external device, the electronic device 101 may generate an alarm for user A. As another example, user B may set the electronic device 101 to wake up him or her when user C wakes up. The electronic device 101 may recognize user C continuously or at a time period by using the camera module 180 or the sensor module 190. The electronic device 101 may generate an alarm for user B when it is determined that user C woke up.

In various embodiments, a setting user who sets an alarm and a target user who is a target of the alarm may be different. For example, the parents may store schedules of children by using the electronic device 101. In various embodiments, the electronic device 101 may determine whether storage of a schedule of another person will be allowed, by using hierarchy information of the user. In the previous example, the hierarchy information of the parents may correspond to 1000 and the hierarchy information of the children may correspond to 100. The electronic device 101 may store the hierarchy information together with identification information of the users, and the user whose hierarchy information corresponds to 1000 may be allowed to set a schedule of the user whose hierarchy information corresponds to 100. In contrast, the electronic device 101 may forbid the user whose hierarchy information corresponds to 100 to set a schedule of the user whose hierarchy information corresponds to 1000. In various embodiments, when the hierarchy information of the two users is identical, the electronic device 101 may allow setting of schedules by each other or may forbid setting of schedules by each other.

Figure 5:
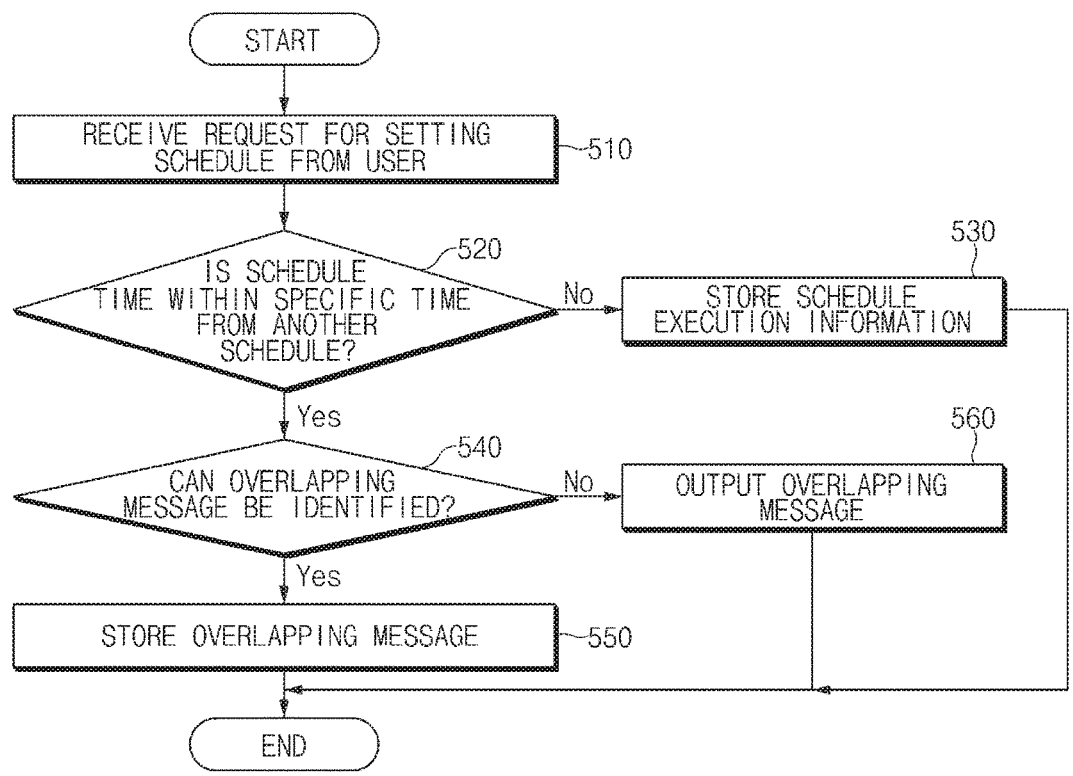
FIG. 5 is a flowchart illustrating a process of processing a repeated schedule between users according to various embodiments.

FIG. 5 is a flowchart illustrating a process of processing a repeated schedule between users according to various embodiments.

Referring to FIG. 5, in operation 510, the electronic device 101 may receive a request for setting a schedule, from a user. The request for setting a schedule may be one of a voice input, a motion input, a touch input, or a button input of the user. For example, when the request is a voice input, the electronic device 101 may recognize a setting user through voice recognition (or face recognition of the user) of the user. The electronic device 101 may collect information, such as a schedule type, an alarm execution time, or an alarm execution site, by parsing a voice of the user.

In operation 520, the electronic device 101 may identify whether the schedule time is the same as or within a specific time range (for example, 5 minutes) from a preset schedule time of another user. The specific time range may be set in advance in consideration of a movement speed of the electronic device 101 and a size of a space used by the electronic device 101.

In operation 530, the electronic device 101 may store a schedule when the schedule time is not within the specific time range. The electronic device 101 may store all requested schedules when the schedule does not overlap a schedule of another user and both the schedules may be executed.

In operation 540, the electronic device 101 may identify whether the user may recognize a schedule overlapping message when the schedule time is within the specific time range. For example, the setting user directly sets a schedule and identifies storage of the schedule in front of the electronic device 101, the schedule overlapping message may be recognized. When the user deviates from a range in which a request for setting a schedule may be recognized through the camera module 180 of the electronic device 101 after the request is made from the electronic device 101, the schedule overlapping message may not be recognized.

In operation 550, the electronic device 101 may output the schedule overlapping message when the user may recognize the schedule overlapping message. The schedule overlapping message may be a message that informs that a schedule may not be stored or an indirect output method (for example, provision of an alarm through a smartwatch) may be used. The schedule overlapping message may be output in a popup window through a display or may be output in a voice through a speaker.

In operation 560, the electronic device 101 may store the schedule overlapping message when the user cannot recognize the schedule overlapping message. The electronic device 101 may output the schedule overlapping message if the user may recognize a message.

Figure 6:
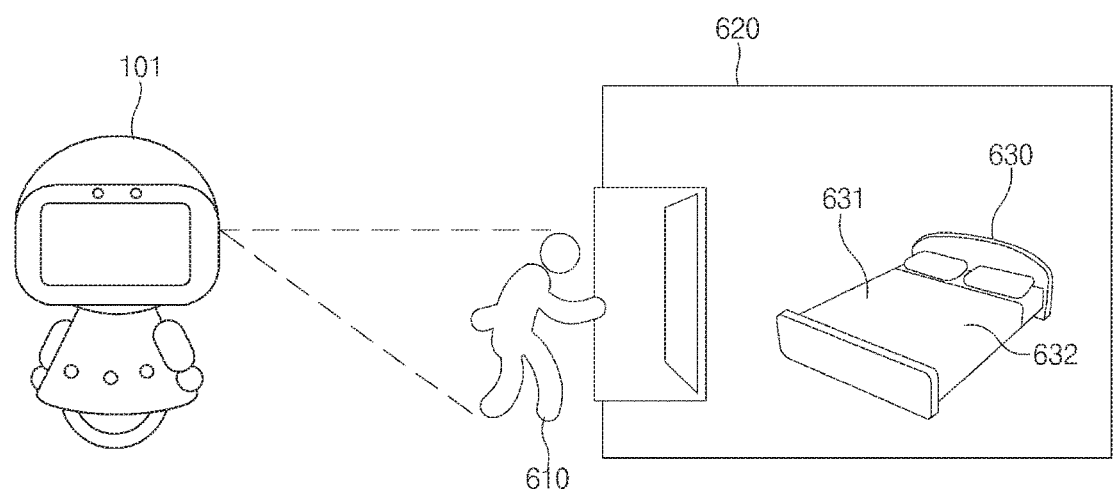
FIG. 6 is a diagram exemplarily illustrating a process of tracking a user according to various embodiments.

FIG. 6 is a diagram exemplarily illustrating a process of tracking a user according to various embodiments.

Referring to FIG. 6, the electronic device 101 may store schedule execution information depending on a schedule setting request of the user. The schedule execution information may include information on at least one of a schedule type, an alarm execution time, or an alarm execution site. The alarm execution site is a site at which an alarm will be executed depending on the schedule, and may be a site at which a target user who is a target of an alarm is situated. When a location of the target user is changed at a time between the alarm setting time and the alarm execution time, the electronic device 101 may track the target user 610 and update the alarm execution site. The electronic device 101 may track the target user by using the camera module 180 or the sensor module 190.

For example, the electronic device 101 may inquire the alarm execution site, from the user who originally sets the schedule. When there is not a separate input on the alarm execution site, the electronic device 101 may store the alarm execution site depending on an action pattern of the target user 610 that is stored in advance. For example, when it is stored that the target user 610 normally goes to sleep in room 1 620 and on the left side 631 of the bed 630, the electronic device 101 may store the alarm execution site of <room 1, bed, left side> in a code form.

When the location of the target user 610 is changed after the schedule is set, the electronic device 101 may track the target user 610 and update the alarm execution site. In the previous example, when the target user 610 goes to sleep after going and getting back from a bathroom at 4:00 a.m. while a morning call for the target user 610 is set to 7 a.m. sharp, the electronic device 101 may change the alarm execution site to <room 1, bed, right side> based on the information obtained by tracking the target user 610 and may store the changed execution site. Further, when the target user 610 goes to sleep again not in room 1 620 but in a living room after going and getting back from a bathroom at 4:00 a.m., the electronic device 101 may change the alarm execution site to <living room, on sofa> based on the information obtained by tracking the target user 610 and store the changed alarm execution site.

In various embodiments, when the user does not set a separate alarm execution site, the electronic device 101 may continuously track the location information of the target user 610 since the schedule is set. For example, the electronic device 101 may identify whether the target user 610 moves to a specific sleeping location after a morning call schedule is set. The electronic device 101 may identify whether the target user 610 is at the corresponding location at a specific time interval.

In various embodiments, the electronic device 101 may receive location information of the target user 610 at a specific time interval by using a wearable device (for example, a smartwatch or a smart band) worn by the target user 610. The electronic device 101 may continuously update an alarm execution site based on the received location information.

In various embodiments, the electronic device 101 may cancel the alarm when the target user 610 deviates from a specific space. For example, when the target user 610 exits from the house after the morning call is set, the electronic device 101 may cancel setting of the morning call.

Figure 7:
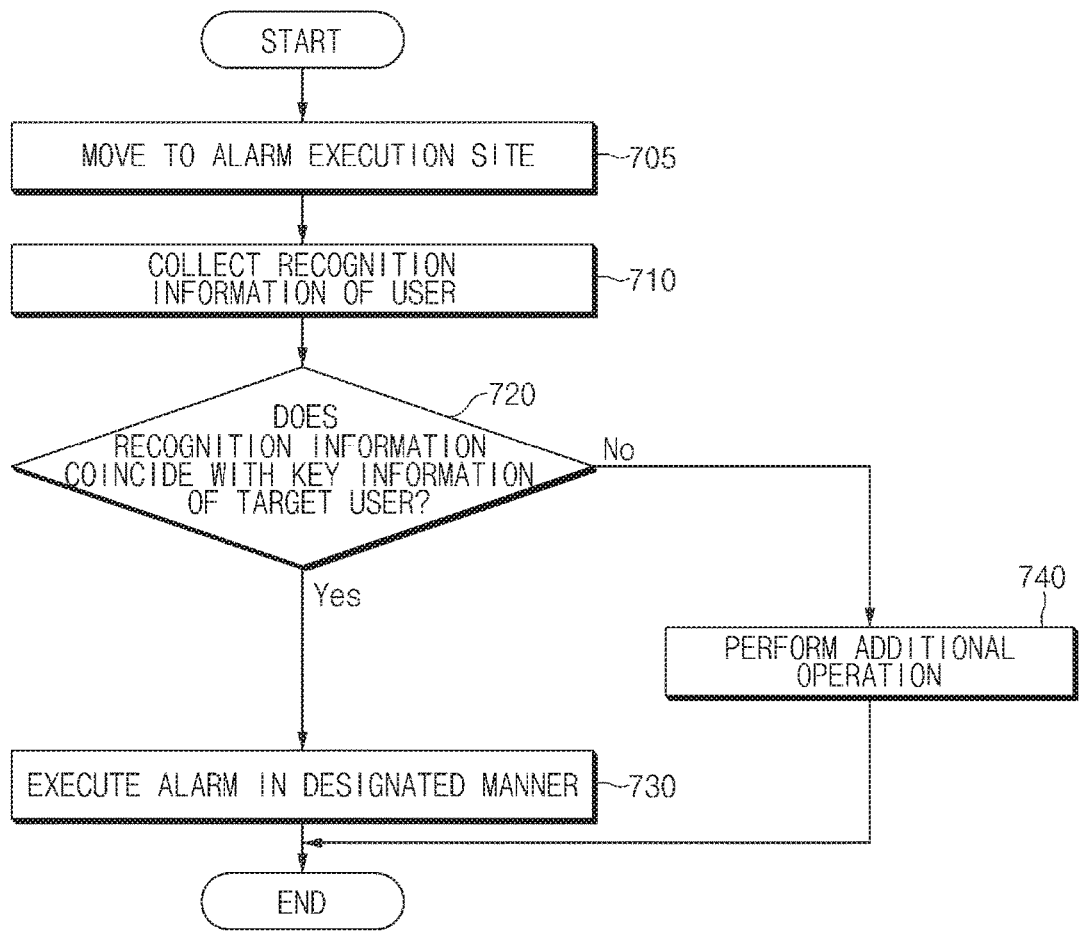
FIG. 7 is a flowchart illustrating an alarm executing method through recognition of a target user according to various embodiments.

FIG. 7 is a flowchart illustrating an alarm executing method through recognition of a target user according to various embodiments.

Referring to FIG. 7, in operation 705, the electronic device 101 may move to an alarm execution site if an alarm execution time is near. The electronic device 101 may move at a specific time before (for example, 5 minutes before) the alarm execution time, and may provide an alarm to the target user at the alarm execution time.

In operation 710, the electronic device 101 may collect recognition information of the user who is at the alarm execution site, by using the camera module 180 or the sensor module 190. In various embodiments, when a plurality of users are in the alarm execution site, the electronic device 101 may collect recognition information on the respective users.

For example, when the electronic device 101 moves to room 1 to wake up a first user (for example, father) who set a morning call schedule, the first user (for example, father) may be sleeping together with a second user (for example, mother). The electronic device 101 may collect recognition information on both the first user (for example, father) and the second user (for example, mother) by using the camera module 180 or the sensor module 190.

In various embodiments, even when the location of the target user 610 is clearly set at the alarm execution site, the electronic device 101 may increase the accuracy of provision of an alarm by collecting recognition information on the user.

In various embodiments, the electronic device 101 may utilize recognition information of a peripheral device. For example, when the target user wears a wearable device such as a smartwatch, the electronic device 101 may receive and use location information and measurement information of the wearable device.

In operation 720, the electronic device 101 may identify whether the collected recognition information and the key information of the target user, which was stored in advance, coincide with each other. The electronic device 101 may determine a location of the target user by comparing the key information of the user, which was stored in advance, and the collected recognition information.

In the previous example, the electronic device 101 may store key information on both the first user (for example, father) and the second user (for example, mother) in advance. For example, the electronic device 101 may store image information, such as the faces, the hair colors, the skin tones, the vein patterns of the hands of the first user (for example, father) and the second user (for example, mother), which are recognized through the camera module 180, in advance. The electronic device 101 may determine a user who stochastically most coincides with the target user based on the recognition information of the users and the key information of the users, which is stored in advance.

In operation 730, when finding a user who coincides with the target user, the electronic device 101 may execution an alarm in a specific manner for the found user. In various embodiments, in order to prevent an alarm from being delivered to the peripheral users who are not the alarm target or minimize inconvenience due to an alarm, the electronic device 101 may provide an alarm to the user in a specific manner in which the user who is the alarm target may be recognized while other users are ignored. For example, the electronic device 101 may provide an alarm by using an indirect or direct method. The indirect method may be a method of executing an alarm by using an interworking peripheral device (for example, a smartwatch or a smart pillow), and the direct method may be a method of executing an alarm by applying a direct stimulus (a sound, light, or a body stimulus) to the user.

In operation 740, when failing to find a user who coincides with the target user, the electronic device 101 may execute an additional operation. For example, a target user may be continuously searched for in a peripheral space or another space or it may be informed of another user (for example, a high level user) that a target user cannot be found so that an alarm cannot be executed.

Figure 8:
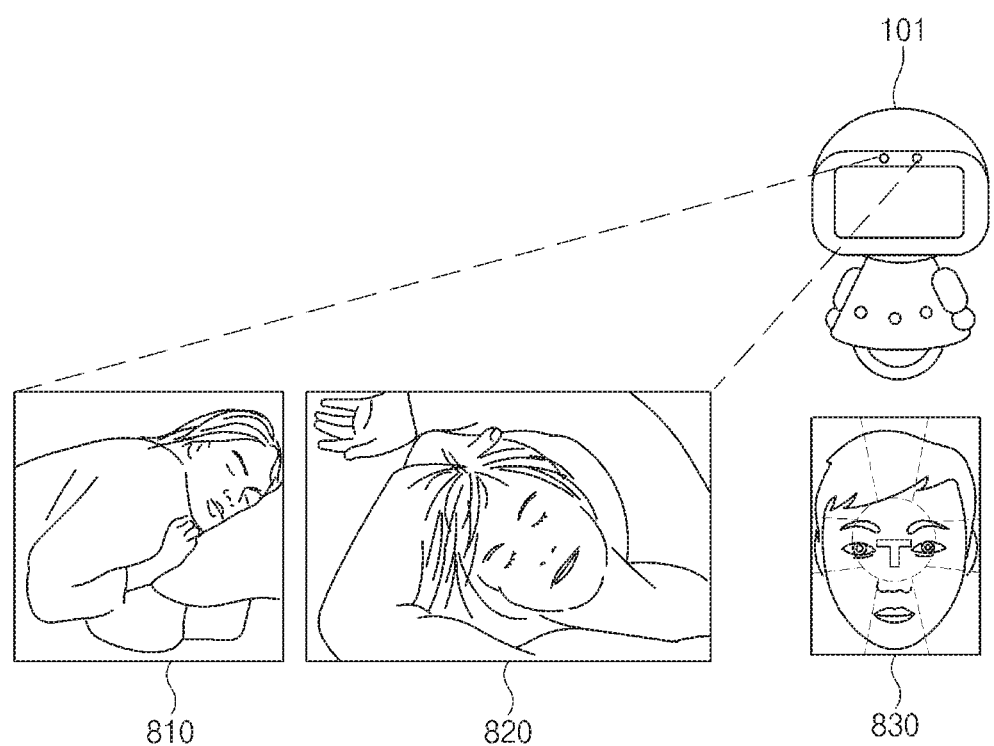
FIG. 8 is a diagram illustrating an example of recognizing a user according to various embodiments.

FIG. 8 is a diagram illustrating an example of recognizing a user according to various embodiments. FIG. 8 is exemplary and the present disclosure is not limited thereto.

Referring to FIG. 8, the electronic device 101 may search for a target user that is an execution target of an alarm by using the camera module 180 or the sensor module 190.

The electronic device 101 may collect recognition information of a user who is at an alarm execution site. When a plurality of users are in the alarm execution site, the electronic device 101 may collect recognition information on the respective users.

For example, the electronic device 101 may move to the alarm execution site to execute an alarm based on a morning call schedule. User A 810 and user B 820 may be sleeping at the alarm execution site. The electronic device 101 may determine a user that coincides with the target user by using key information 830 of the target user, which is stored in the memory 130. The electronic device 101 may collect face images of the users by using a depth camera. The electronic device 101 may extract key points of the collected images through image processing. The electronic device 101 may additionally use an infrared ray camera in a low illumination situation.

In various embodiments, when the electronic device 101 may search for a user by using other key information of the target user when it cannot recognize the face of the user. For example, when the user is sleeping while his or her head being attached to a pillow, the electronic device 101 may collect sensing information such as a breathing sound, a heart rate, a brain wave, a vein form, or an odor, by using the sensor module 190. The electronic device 101 may compare the collected sensing information and the key information on the target user, which was stored in advance, to search for the user.

Figure 9:
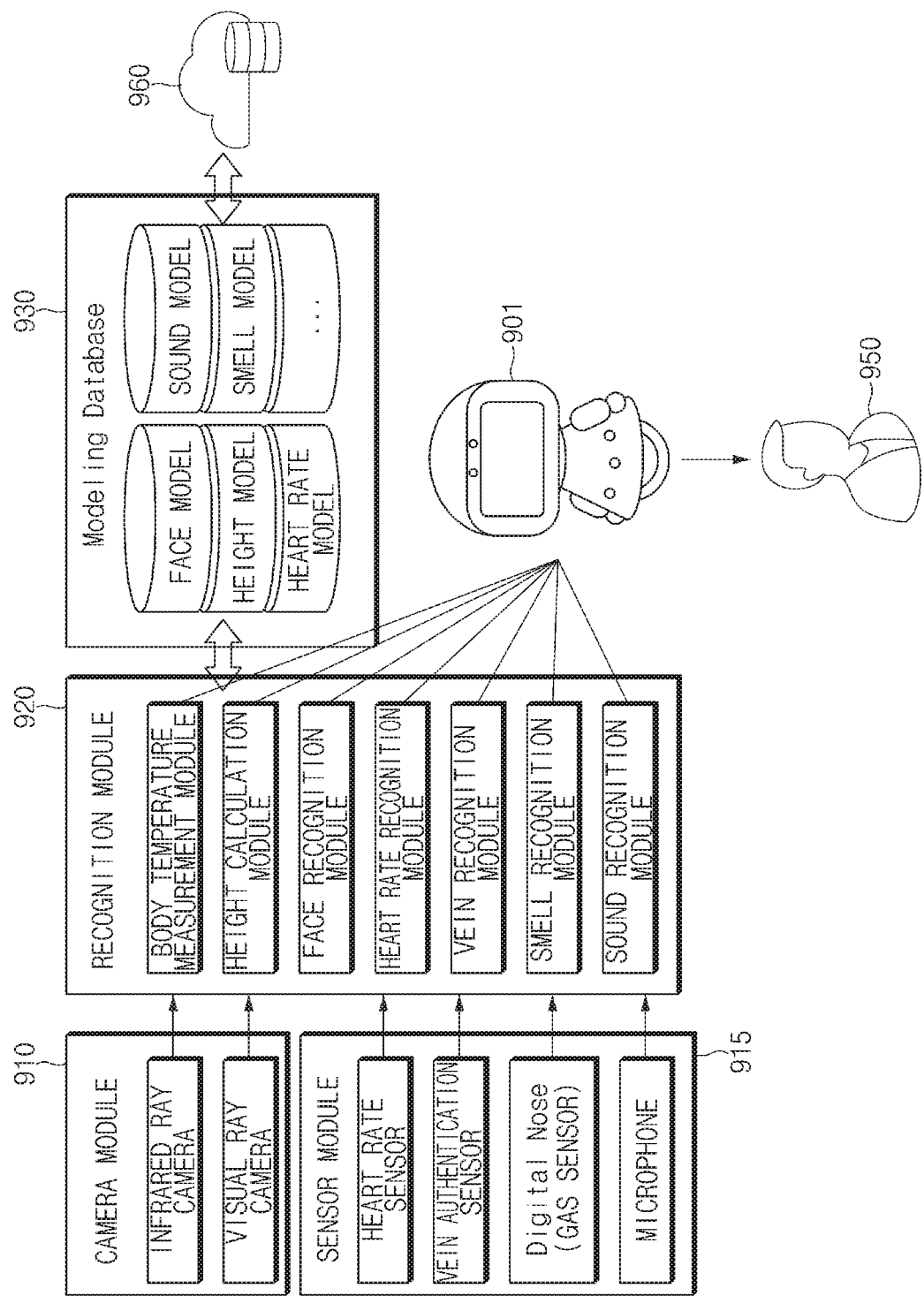
FIG. 9 is a block diagram for explaining an example of recognizing and storing user information according to various embodiments.

FIG. 9 is a block diagram for explaining an example of recognizing and storing user information according to various embodiments. In various embodiments, the electronic device 901 may be the electronic device 101 of FIG. 1.

Referring to FIG. 9, the electronic device 901 may collect information on a plurality of users by using the camera module 910 or the sensor module 915.

The camera module 910 may include an infrared ray camera or a visible ray camera. However, this is exemplary and the present disclosure is not limited thereto. The camera module 910 may include a 3D camera such as a depth camera. The camera module 910 may photograph an image of the user. The photographed image may be used to extract a key point through image processing.

The sensor module 915 may include a heart rate sensor, a vein authentication sensor, a gas sensor, and a microphone. However, this is exemplary and the present disclosure is not limited thereto. The sensor module 915 may further include a fingerprint sensor, an iris sensor, and a recognition sensor.

The information collected through the camera module 910 or the sensor module 915 may be processed through the recognition module 920. In various embodiments, the recognition module 920 may be implemented by a part of a processor in the electronic device 901. The recognition module 920 may synthesize and process the collected information (for example, a body temperature, a height of the body, a face, a heart rate, a vein, an odor, and a sound) through the camera module 910 or the sensor module 915.

The recognition module 920 may classify and hierarchize data for a plurality of users who are using the electronic device 901.

The recognition module 920 may store information on the users in a database 930. In various embodiments, the information stored in the database 930 may be stored in an external cloud device 960 through a communication module.

The electronic device 901 may collect recognition information of the user at the alarm execution site by using information processed through the recognition module 920 or the camera module 910 or the sensor module 915 and may compare the collected recognition information of the user and key information of the target user 950 stored in the database 930.

Figure 10:
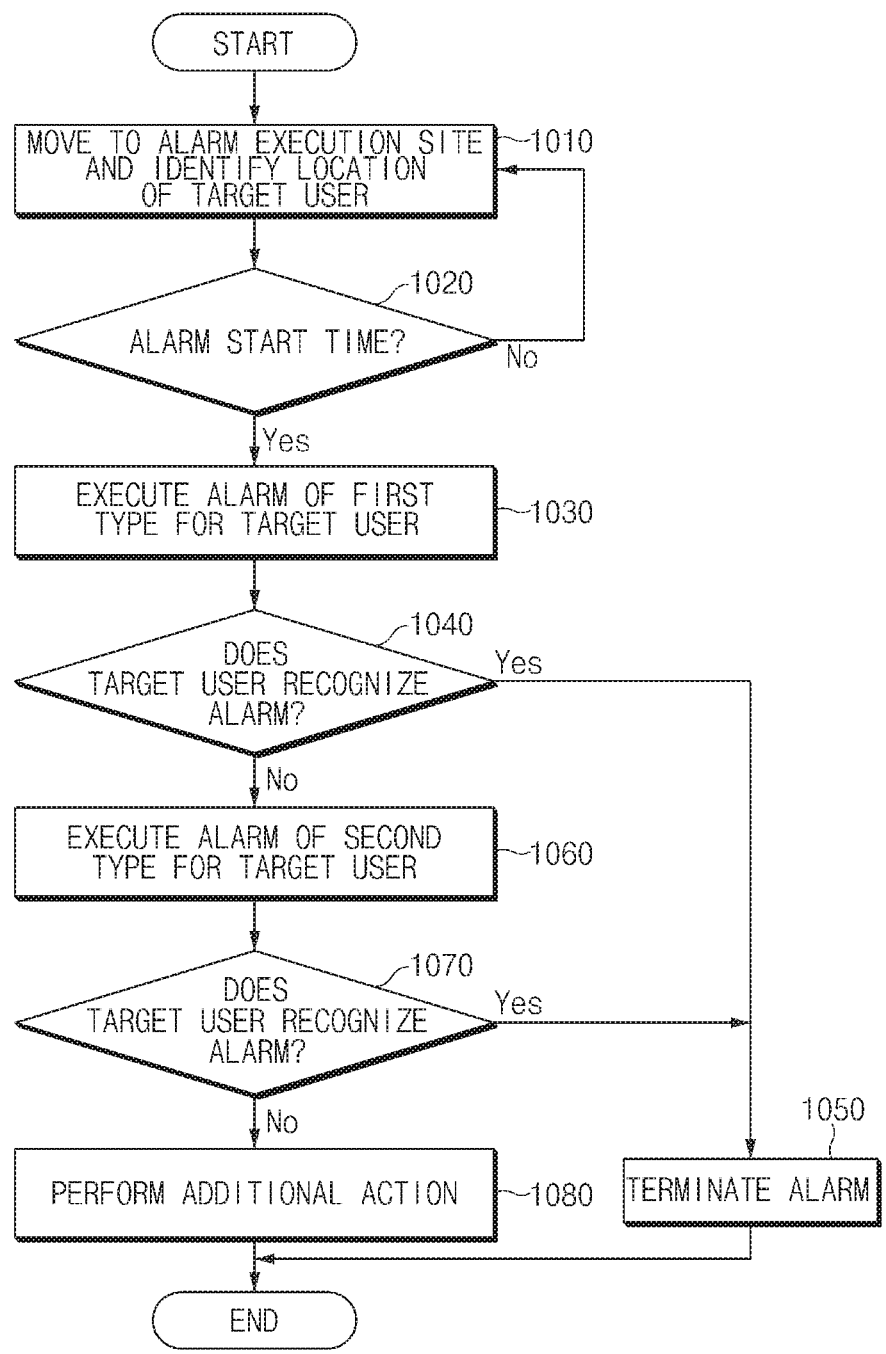
FIG. 10 is a flowchart illustrating a method of executing an alarm according to various embodiments.

FIG. 10 is a flowchart illustrating a method of executing an alarm according to various embodiments.

Referring to FIG. 10, in operation 1010, the electronic device 101 may move to an alarm execution site before an alarm start time, and may identify a location of the target user. The electronic device 101 may collect recognition information of the user who is at the alarm execution site, by using the camera module 180 or the sensor module 190. The electronic device 101 may determine a location of the target user based on the recognition information.

In operation 1020, the electronic device 101 may identify whether the alarm start time comes. The electronic device 101 may stand by before the alarm start time.

In operation 1030, the electronic device 101 may execute an alarm of a first type, for the target user if the alarm start time comes. In various embodiments, the first type may be an indirect alarm type in which the electronic device 101 provides an alarm to the user by using a peripheral device without generating a direct stimulus for the target user. For example, the first type may be a type in which an alarm is executed by using an interworking peripheral device (for example, a smartwatch or a smart pillow).

In operation 1040, the electronic device 101 may identify whether the user recognizes the alarm of the first type. For example, in the case of a morning call, the electronic device 101 may identify whether the user is awake or fell out of bed, through the image collected through the camera module 180.

In operation 1050, the electronic device 101 may terminate the alarm of the first type when the target user recognizes the alarm of the first type. In various embodiments, the electronic device 101 may provide additional information to the target user. The additional information may be information that is related to an interested theme, such as weather information, traffic information, sports game information of the corresponding day, which was set in advance by the user.

In operation 1060, the electronic device 101 may provide the alarm of the second type when the target user fails to recognize the alarm of the first type.

The second type may be a type in which an alarm for a user is executed through a direct stimulus (a sound, light, or a body stimulus). For example, in the case of a morning call, the electronic device 101 may contact a part (for example, the face, an arm, or a leg) of the body of the user by using a robot arm. In another example, the electronic device 101 may output light in the form of a beam to the eyes of the target user, or may output a sound using a directional speaker to the ears of the target user.

In operation 1070, the electronic device 101 may identify whether the target user recognizes the alarm of the second type. The electronic device 101 may terminate the alarm of the second type when the target user recognizes the alarm of the second type.

In operation 1080, when the target user fails to recognize the alarm of the second type, the electronic device 101 may perform an additional operation. For example, the additional operation may be an operation of make a phone call to a specific phone number (for example, 911) or generating a separate alarm for another nearby user. For example, the additional operation may be an operation of generating an alarm through the third type (for example, turning on radio set or TV).

Figure 11:
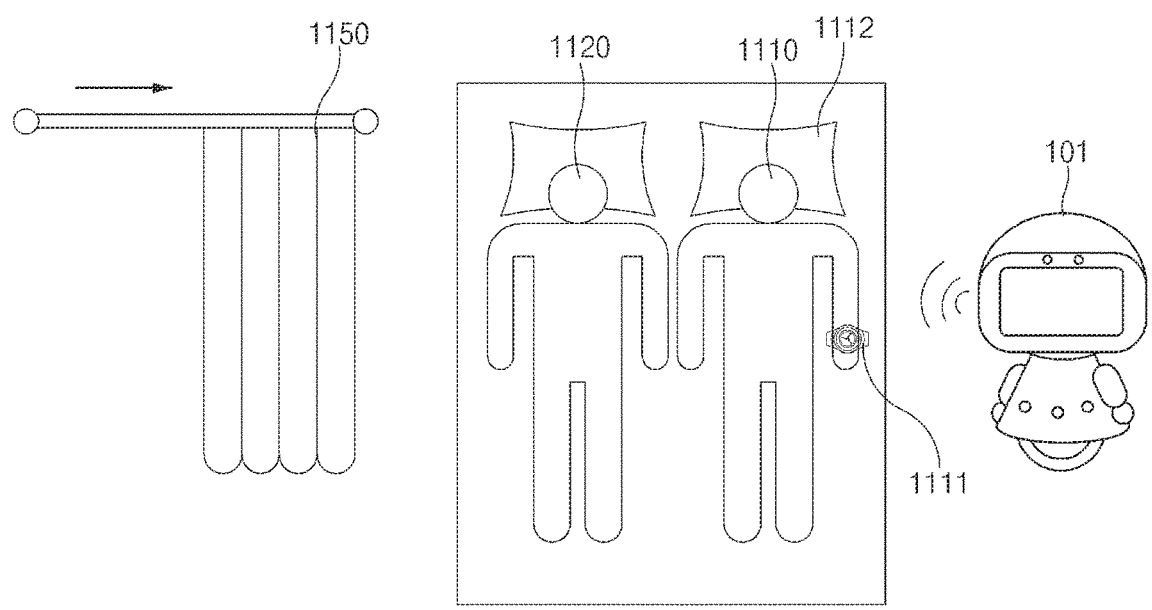
FIG. 11 is a diagram illustrating an indirect alarm according to various embodiments.

FIG. 11 is a diagram for explaining an indirect alarm according to various embodiments. FIG. 11 is exemplary and the present disclosure is not limited thereto.

Referring to FIG. 11, the electronic device 101 may execute an indirect alarm for the target user if the alarm start time comes. The indirect alarm may be a type in which the electronic device 101 provides an alarm to the user by using a peripheral device, without generating a direct stimulus for the target user.

For example, in the morning call schedule, when user A 1110 and user B 1120 are sleeping at an alarm execution site, the electronic device 101 may recognize user A 1110 who is the target user by using the camera module 180 or the sensor module 190.

The electronic device 101 may apply a main stimulus to user A 1110 by using a peripheral device. In contrast, the electronic device 101 may not apply a stimulus to the peripheral user B 1120 or may minimize a stimulus to the peripheral user B 1120.

In various embodiments, the electronic device 101 may generate a signal for generating vibration for a wearable device (for example, a smartwatch) 1111 which user A 1110 is wearing. The wearable device 1111 may be set to interwork with the electronic device 101 in advance. The wearable device 1111 may generate vibration based on the signal of the electronic device 101 to wake up user A 1110. Similarly, the electronic device 101 may transmit a signal to a smart pillow 1112 to generate vibration or a sound that wakes up user A 1110.

In various embodiments, the electronic device 101 may execute an indirect alarm for the user, by using a peripheral device arranged at the alarm execution site. For example, the electronic device 101 may wake up user A 1110 through external light by operating an electrically driven curtain 1150 arranged at the alarm execution site. The electronic device 101 may generate a signal for manipulating a part of the electrically driven curtain 1150 to prevent the external light from being projected to the peripheral user B 1120.

According to various embodiments, the electronic device 101 may not directly move to the alarm execution site when executing an indirect alarm. For example, if the alarm start time comes, the electronic device 101 may transmit a signal for manipulating a peripheral device that is around the target user. The target user may recognize an alarm through a stimulus generated by the peripheral device.

Figure 12:
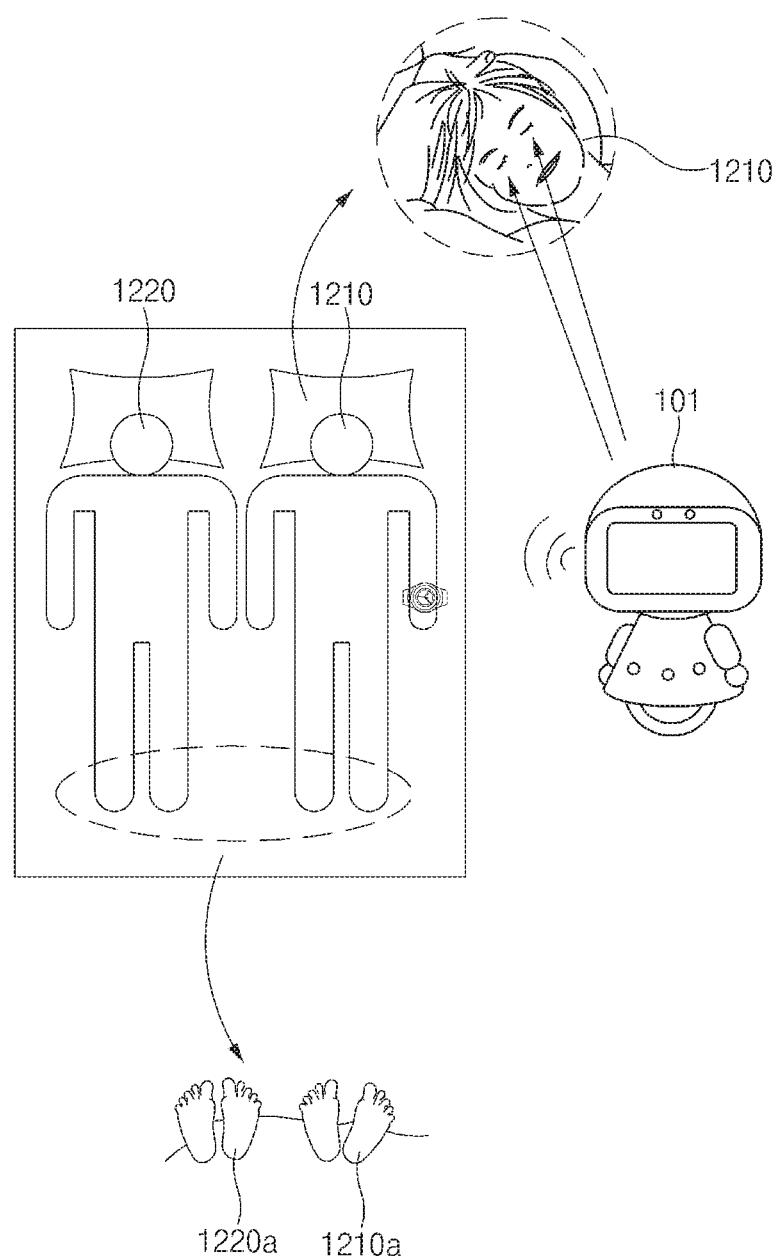
FIG. 12 is a diagram illustrating a direct alarm according to various embodiments.

FIG. 12 is a diagram for explaining a direct alarm according to various embodiments. FIG. 12 is simply exemplary, and the present disclosure is not limited thereto.

Referring to FIG. 12, the electronic device 101 may move to the alarm execution site included in the schedule execution information if the alarm execution time comes or is near.

The electronic device 101 may execute a direct alarm for the target user if the alarm start time comes. The direct alarm may be a type in which the electronic device 101 provides an alarm to the user by generating a direct stimulus for the target user.

For example, in the morning call schedule, when user A 1210 and user B 1220 are sleeping at an alarm execution site, the electronic device 101 may recognize user A 1210 who is the target user by using the camera module 180 or the sensor module 190. The electronic device 101 may directly generate an external stimulus for user A 1210 to provide an alarm to user A 1210.

In an embodiment, the electronic device 101 may output a sound using a directional speaker to the ears of the user A 1210. The directional speaker may be a speaker that radiates a sound in a specific direction. The sound generated by the directional speaker may be louder to user A 1210, and may be weaker or may not be audible to the peripheral user B 1220.

In another embodiment, the electronic device 101 may output light in the form of a beam to the eyes of the user A 1210. The light in the form of a beam may be brighter to user A 1210 or may not influence the peripheral user B 1220.

In another embodiment, the electronic device 101 may contact or stimulate a part (for example, a foot 1210a) of the body of user A 1210 by using a robot arm. For example, the electronic device 101 may generate an electric shock, vibration, or a haptic feedback, which is weak, to the part of the body of user A 1210.

In various embodiments, the electronic device 101 may photograph parts of the bodies of users who are at the alarm execution site by using the camera module 180, or may stimulate a part of the body that corresponds to data which was stored in advance. For example, the electronic device 101 may photograph images of a foot 1210a of user A 1210 and a foot 1220a of user B, and may identify whether the data corresponds to the size or shape of the foot of user A 1210, which was stored in advance, to generate a direct stimulus for user A 1210.

Figure 13:
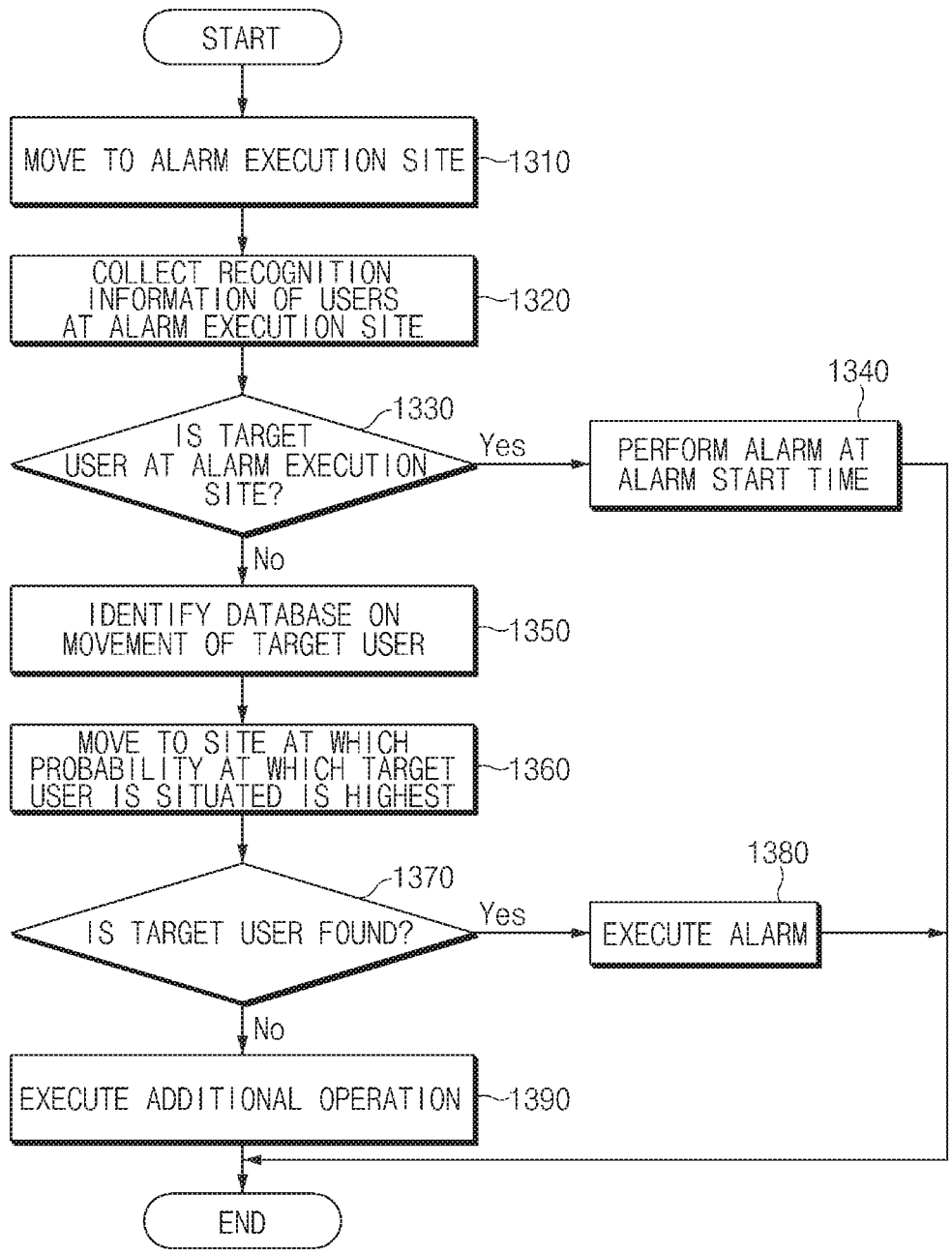
FIG. 13 is a flowchart illustrating processing corresponding to a case in which a target user cannot be found at an alarm execution time according to various embodiments.

FIG. 13 is a flowchart illustrating processing corresponding to a case in which a target user cannot be found at an alarm execution time according to various embodiments.

Referring to FIG. 13, in operation 1310, the electronic device 101 may move to an alarm execution site before an alarm start time.

In operation 1320, the electronic device 101 may collect recognition information of the user who is at the alarm execution site, by using the camera module 180 or the sensor module 190.

In operation 1330, the electronic device 101 may identify whether a target user is among the users at the alarm execution site, based on the collected recognition information.

In operation 1340, the electronic device 101 may execute an alarm if an alarm start time comes when a target user is found, at the alarm execution site which was stored in advance.

In operation 1350, the electronic device 101 may search for a database on movement of the target user when the target user is not found or cannot be recognized. The database may be data that was obtained by accumulating location movement information of the target user for respective times and then was stored.

In operation 1360, the electronic device 101 may move to a site, at which the probability at which the target user is situated is highest, based on the result obtained by searching for the database.

In operations 1370 and 1380, the electronic device 101 may identify whether the target user is at the moved site, and may execute an alarm based on a designated type when the target user is found. The designated type may include at least one of an indirect type or a direct type.

In operation 1390, when failing to find the target user, the electronic device 101 may execution an additional operation. The additional operation may include an operation of providing an alarm to another nearby user, an operation of making a phone call to a specific phone number (for example, 911), or an operation of generating an alarm of another type (for example, turning on radio or TV).

According to various embodiments, a method of outputting an alarm, the method being performed by an electronic device, the method may include receiving a request for setting a schedule, from at least one user, storing identification information and schedule execution information on the user, tracking a target user of the schedule and if an alarm execution time included in the schedule execution information comes, providing an alarm related to the schedule to the target user in a specific manner.

According to various embodiments the receiving of the request may include receiving the request through at least one of a voice input, a motion input, a button input, or a touch input.

According to various embodiments, the receiving of the request may include collecting identification information of the user through at least one of voice recognition, motion recognition, touch recognition, or face recognition of the user who sets the schedule.

According to various embodiments, the receiving of the request may include receiving a request for setting a schedule on a second user, from a first user.

According to various embodiments, the receiving of the request may include identifying whether a time of the schedule is the same as or within a time range from a time of a preset schedule of another user and if the time of the schedule is within the time range from the preset schedule, outputting a schedule overlapping message.

According to various embodiments, the storing of the schedule execution information may include storing information on an attribute of the schedule, and an alarm execution time and an alarm execution site for the schedule.

According to various embodiments, the storing of the schedule execution information may include identifying key information of the user that is stored in advance, based on the identification information, and storing the identified key information together with the schedule.

According to various embodiments, the tracking of the target user may include if the target user moves before the alarm execution time, updating an alarm execution site included in the schedule execution information.

According to various embodiments, the tracking of the target user may include identifying a location of the target user at a time interval.

According to various embodiments, the providing of the alarm may include moving to an alarm execution site included in the schedule execution information.

According to various embodiments, the moving to the alarm execution site may include moving to the alarm execution site before a preset time from the alarm execution time or at the alarm execution time.

According to various embodiments, the moving to the alarm execution site may include collecting recognition information on at least one user who is at the alarm execution site and comparing the collected recognition information and key information of the target user, which is stored in advance.

According to various embodiments, the providing of the alarm may include providing the alarm by using a peripheral device of the target user.

According to various embodiments, the providing of the alarm may include if the alarm execution time comes, transmitting a signal that requests the peripheral device, which was set to interwork with the electronic device in advance, to generate an alarm.

According to various embodiments, the providing of the alarm may include outputting a sound using a directional speaker or light in a form of a beam to the target user.

According to various embodiments, the providing of the alarm may include recognizing a part of the body of the target user and generating a stimulus to the part of the body.

According to various embodiments, the storing of the schedule execution information may include adjusting an alarm execution time included in the schedule execution information, depending on an event.

According to various embodiments, the adjusting of the alarm execution time may include providing biometric information related to the user, through an external device that was set to interwork with the electronic device in advance.

According to various embodiments, the adjusting of the alarm execution time may include receiving information on an event related to execution of the schedule, through an external device that was set to interwork with the electronic device.

According to various embodiments, the method of outputting an alarm may further include if the target user recognizes the alarm, providing additional information related to the schedule to the target user.

Figure 14:
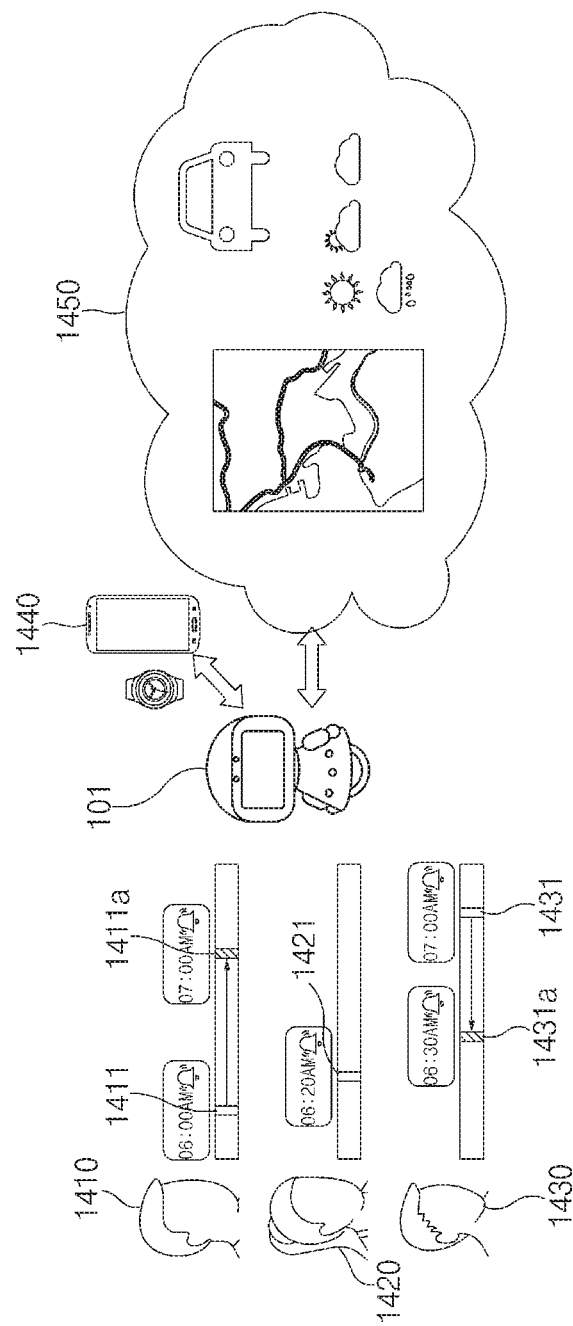
FIG. 14 is a diagram illustrating an example of adjusting an alarm start time based on generation of an event according to various embodiments.

FIG. 14 is a diagram illustrating an example of adjusting an alarm start time based on generation of an event according to various embodiments.

Referring to FIG. 14, the electronic device 101 may adjust an alarm start time based on generation of a specific event. For example, when user A 1410, user B 1420, and user C stored morning call schedules, respectively, the electronic device 101 may advance or delay morning call times, based on individual events applied to the users.

In an embodiment, the electronic device 101 may be set to interwork with a personal device (for example, a smartphone or a smartwatch) 1440 of user A 1410. The electronic device 101 may receive biometric information (for example, a quantity of motion of the day before or the number of tosses and turns during a sleep) of user A 1410. When the quantity of motion of the user A 1410 is large or user A 1410 waked up frequently, the electronic device 101 may change the set alarm start time 1411 (06:00 a.m.) to a renewed (or updated) alarm state time 1411a (07:00 a.m.), based on the biometric information.

In another embodiment, the electronic device 101 may adjust an alarm start time based on information (for example, weather information, traffic information, or vehicle regulation information) provided through an external device 1450 (for example, a cloud server). For example, when determining that it is raining or the traffic congestion is severe, the electronic device 101 may calculate an expected arrival time, and may change an alarm start time 1431 (07:00 a.m.) of user C 1430 to a renewed (or updated) alarm start time 1431a (06:00 a.m.)

The event of FIG. 14 is exemplary and the present disclosure is not limited thereto. For example, the event may be set to various conditions such as a condition of the user, presence of a holiday, and presence of a peripheral user.

Figure 15:
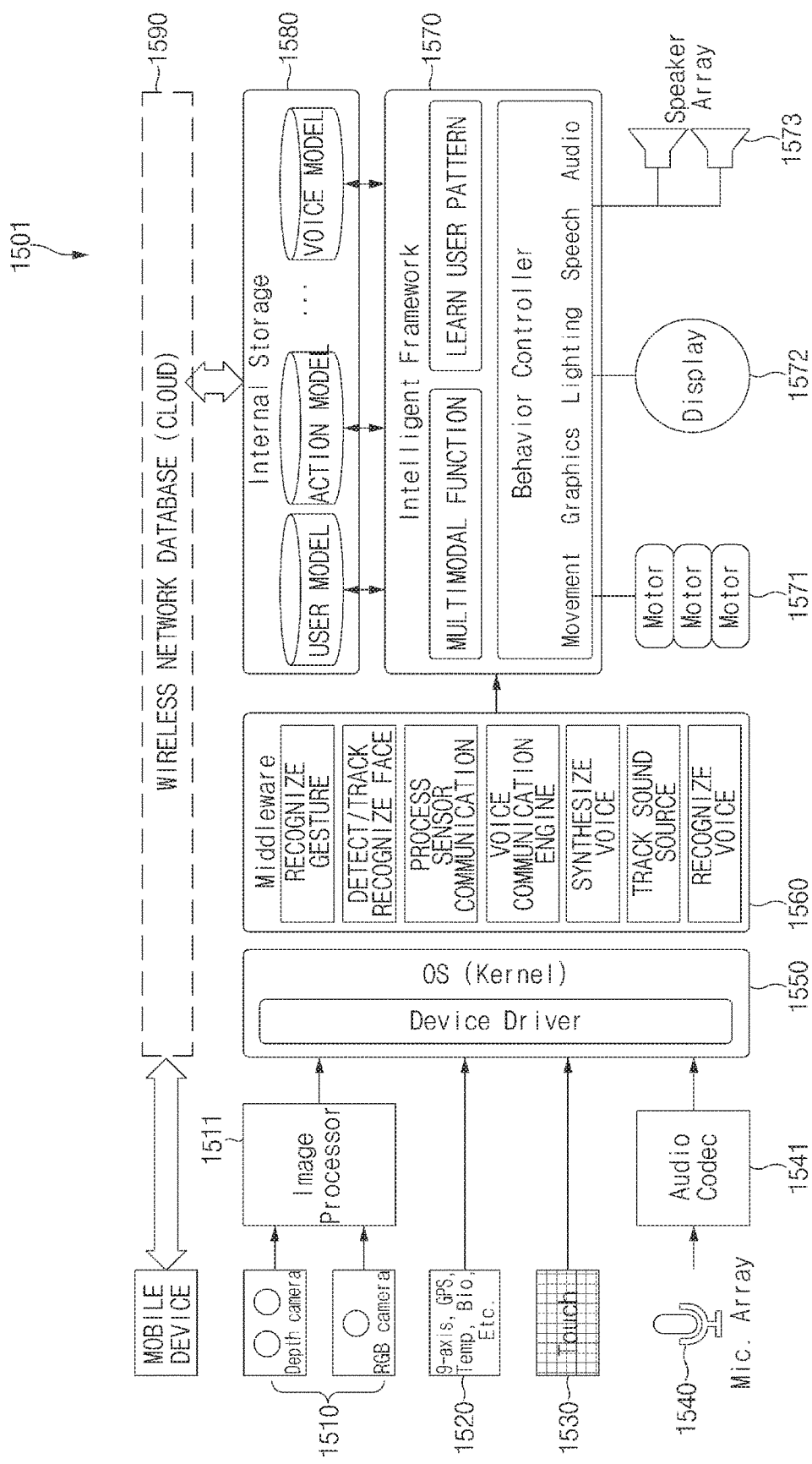
FIG. 15 is a block diagram illustrating main configurations of an electronic device that stores data on a user according to various embodiments.

FIG. 15 is a block diagram illustrating main configurations of an electronic device that stores data on a user according to various embodiments. The electronic device 1501 may be the electronic device 101 of FIG. 1. FIG. 15 is simply exemplary, and the present disclosure is not limited thereto.

Referring to FIG. 15, the electronic device 1501 may receive an input on a user by using a camera module 1510, a sensor module 1520, a touch panel 1530, and a microphone 1540. The image collected through the camera module 1510 may be converted through an image processor 1511, and data collected through the microphone 1540 may be converted through an audio codec 1541.

The operating system (kernel) 1550 may function as a general operating system, for example, for distributing resources of the electronic device 1501 and scheduling businesses. Further, the operating system (kernel) 1550 may include a device driver module that controls various hardware devices (a camera module, a sensor module, and a microphone) and processes signals input by the hardware device.

The middleware 1560 may detect or track a location of the face of the user by using data signal-processed through the operating system (kernel) 1550 or perform an authentication through recognition of the face, and may recognize a 3D gesture of the user, track a location of an input for an audio signal (DOA, direct of arrival), recognize a voice, and process signals of data of various sensors.

The intelligent framework 1570 may be classified into a multimodal fusion block, a user pattern learning block, and an action control block. The multimodal fusion block may collect and manage various pieces of information processed by the middleware 1560. The user pattern learning block may extract and learn meaningful information such as a life pattern or a preference of the user, by using multimodal fusion module information. The action control block may express information, which is to be fed back to the user by the electronic device through a motor 1571, a display 1572 (for example, graphic (UI/UX) or light), or a speaker 1573 of the electronic device 1501.

The memory 1580 may include a user model DB that stores information learned by the intelligent framework 1570 according to a user, an action model DB for an action control of the electronic device, and a voice model DB that stores voice information.

The cloud server 1590 ma share data stored in the memory 1580 through a network.

Figure 16:
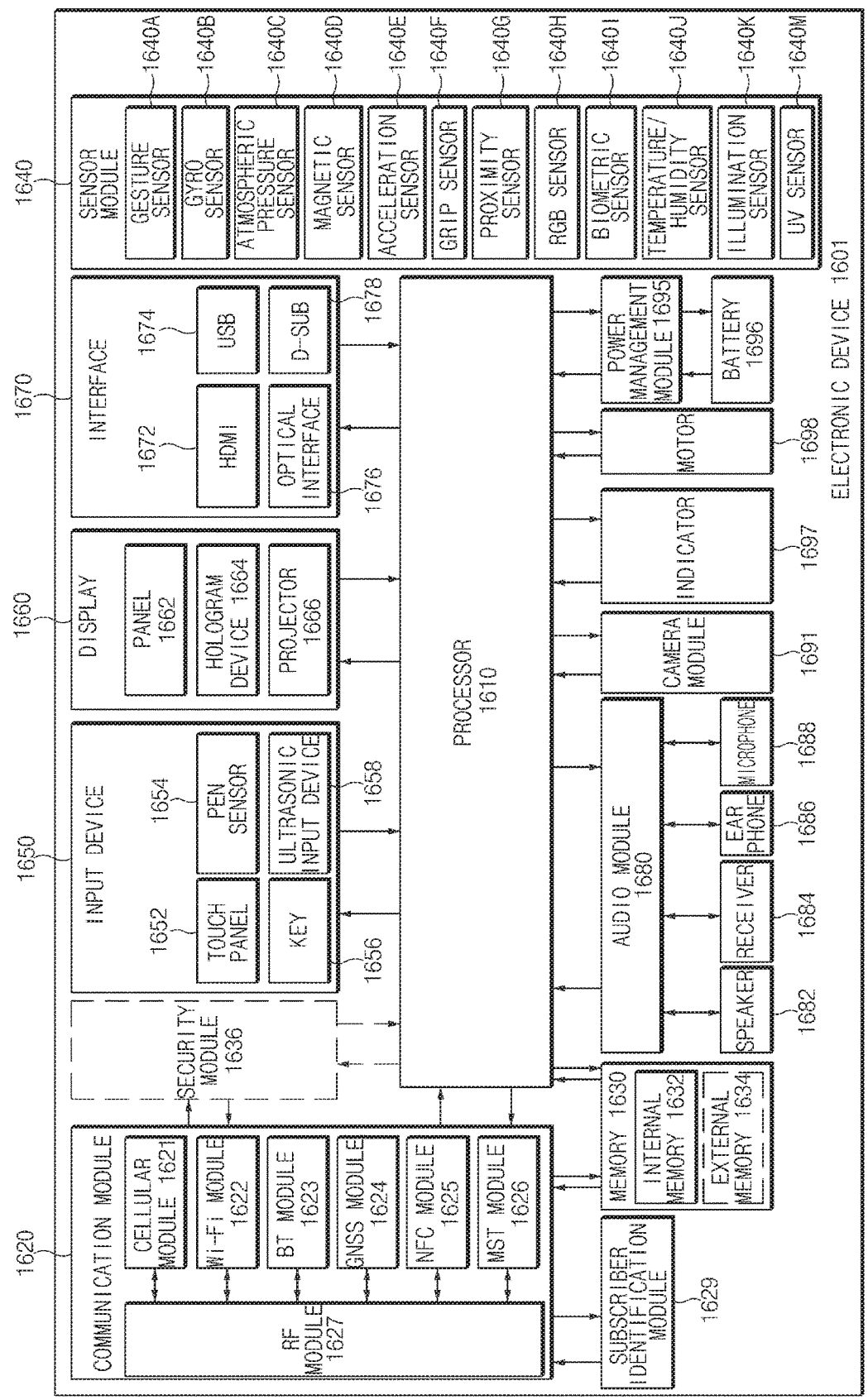
FIG. 16 is a block diagram illustrating an electronic device according to various embodiments.

FIG. 16 is a block diagram of an electronic device according to various embodiments. An electronic device 1601 may include, for example, all or a part of the electronic device 161 illustrated in FIG. 1. The electronic device 1601 may include one or more processors (e.g., an application processor (AP)) 1610, a communication module 1620, a subscriber identification module 1624, a memory 1630, a sensor module 1640, an input device 1650, a display 1660, an interface 1670, an audio module 1680, a camera module 1691, a power management module 1695, a battery 1696, an indicator 1697, and a motor 1698.

The processor 1610 may drive an operating system (OS) or an application to control a plurality of hardware or software elements connected to the processor 1610 and may process and compute a variety of data. The processor 1610 may be implemented with a System on Chip (SoC), for example. According to an embodiment, the processor 1610 may further include a graphic processing unit (GPU) and/or an image signal processor. The processor 1610 may include at least a part (e.g., a cellular module 1621) of elements illustrated in FIG. 16. The processor 1610 may load and process an instruction or data, which is received from at least one of other elements (e.g., a nonvolatile memory) and may store a variety of data in a nonvolatile memory.

The communication module 1620 may be configured the same as or similar to the communication interface 170 of FIG. 1. The communication module 1620 may include a cellular module 1621, a Wi-Fi module 1622, a Bluetooth (BT) module 1723, a GNSS module 1624 (e.g., a GPS module, a Glonass module, a Beidou module, or a Galileo module), a near field communication (NFC) module 1625, an MST module 1626, and a radio frequency (RF) module 1627.

The cellular module 1621 may provide voice communication, video communication, a message service, an Internet service or the like through a communication network. According to an embodiment, the cellular module 1621 may perform discrimination and authentication of the electronic device 1601 within a communication network using the subscriber identification module 1624 (e.g., a SIM card), for example. According to an embodiment, the cellular module 1621 may perform at least a portion of functions that the processor 1610 provides. According to an embodiment, the cellular module 1621 may include a communication processor (CP).

Each of the Wi-Fi module 1622, the BT module 1723, the GNSS module 1624, and the NFC module 1625 may include a processor for processing data exchanged through a corresponding module, for example. According to an embodiment, at least a part (e.g., two or more elements) of the cellular module 1621, the Wi-Fi module 1622, the BT module 1723, the GNSS module 1624, or the NFC module 1625 may be included within one Integrated Circuit (IC) or an IC package.

The RF module 1627 may transmit and receive, for example, a communication signal (e.g., an RF signal). The RF module 1627 may include, for example, a transceiver, a power amplifier module (PAM), a frequency filter, a low noise amplifier (LNA), an antenna, or the like. According to another embodiment, at least one of the cellular module 1621, the Wi-Fi module 1622, the BT module 1723, the GNSS module 1624, or the NFC module 1625 may transmit and receive an RF signal through a separate RF module.

The subscriber identification module 1624 may include, for example, a card and/or embedded SIM that includes a subscriber identification module and may include unique identify information (e.g., integrated circuit card identifier (ICCID)) or subscriber information (e.g., international mobile subscriber identity (IMSI)).

The memory 1630 (e.g., the memory 130) may include an internal memory 1632 or an external memory 1634. For example, the internal memory 1632 may include at least one of a volatile memory (e.g., a dynamic random access memory (DRAM), a static RAM (SRAM), or a synchronous DRAM (SDRAM)), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, or a NOR flash memory), a hard drive, or a solid state drive (SSD).

The external memory 1634 may include a flash drive, for example, compact flash (CF), secure digital (SD), micro secure digital (Micro-SD), mini secure digital (Mini-SD), extreme digital (xD), multimedia card (MMC), a memory stick, or the like. The external memory 1634 may be functionally and/or physically connected with the electronic device 1601 through various interfaces.

The sensor module 1640 may measure, for example, a physical quantity or may detect an operation state of the electronic device 1601. The sensor module 1640 may convert the measured or detected information to an electric signal. The sensor module 1640 may include at least one of a gesture sensor 1640A, a gyro sensor 1640B, a barometric pressure sensor 1640C, a magnetic sensor 1640D, an acceleration sensor 1640E, a grip sensor 1640F, a proximity sensor 1640G, a color sensor 1640H (e.g., red, green, blue (RGB) sensor), a biometric sensor 1640I, a temperature/humidity sensor 1640J, an illuminance sensor 1640K, or an UV sensor 1640M. Even though not illustrated, additionally or alternatively, the sensor module 1640 may include, for example, an E-nose sensor, an electromyography sensor (EMG) sensor, an electroencephalogram (EEG) sensor, an electrocardiogram (ECG) sensor, an infrared (IR) sensor, an iris sensor, and/or a fingerprint sensor. The sensor module 1640 may further include a control circuit for controlling at least one or more sensors included therein. According to an embodiment, the electronic device 1601 may further include a processor which is a part of the processor 1610 or independent of the processor 1610 and is configured to control the sensor module 1640. The processor may control the sensor module 1640 while the processor 1610 remains at a sleep state.

The input device 1650 may include, for example, a touch panel 1652, a (digital) pen sensor 1654, a key 1656, or an ultrasonic input device 1658. The touch panel 1652 may use at least one of capacitive, resistive, infrared and ultrasonic detecting methods. Also, the touch panel 1652 may further include a control circuit. The touch panel 1652 may further include a tactile layer to provide a tactile reaction to a user.

The (digital) pen sensor 1654 may be, for example, a portion of a touch panel or may include an additional sheet for recognition. The key 1656 may include, for example, a physical button, an optical key, a keypad, or the like. The ultrasonic input device 1658 may detect (or sense) an ultrasonic signal, which is generated from an input device, through a microphone (e.g., a microphone 1688) and may check data corresponding to the detected ultrasonic signal.

The display 1660 (e.g., the display 160) may include a panel 1662, a hologram device 1664, or a projector 1666. The panel 1662 may be configured the same as or similar to the display 160 of FIG. 1. The panel 1662 may be implemented to be flexible, transparent or wearable, for example. The panel 1662 and the touch panel 1652 may be integrated into a single module. The hologram device 1664 may display a stereoscopic image in a space using a light interference phenomenon. The projector 1666 may project light onto a screen so as to display an image. The screen may be arranged inside or outside the electronic device 1601. According to an embodiment, the display 1660 may further include a control circuit for controlling the panel 1662, the hologram device 1664, or the projector 1666.

The interface 1670 may include, for example, a high-definition multimedia interface (HDMI) 1672, a universal serial bus (USB) 1674, an optical interface 1676, or a D-subminiature (D-sub) 1678. The interface 1670 may be included, for example, in the communication interface 170 illustrated in FIG. 1. Additionally or alternatively, the interface 1670 may include, for example, a mobile high definition link (MHL) interface, a SD card/multi-media card (MMC) interface, or an infrared data association (IrDA) standard interface.

The audio module 1680 may convert a sound and an electrical signal in dual directions. At least a part of the audio module 1680 may be included, for example, in the input/ output interface 150 illustrated in FIG. 1. The audio module 1680 may process, for example, sound information that is input or output through a speaker 1682, a receiver 1684, an earphone 1686, or a microphone 1688.

The camera module 1691 for shooting a still image or a video may include, for example, at least one image sensor (e.g., a front sensor or a rear sensor), a lens, an image signal processor (ISP), or a flash (e.g., an LED or a xenon lamp).

The power management module 1695 may manage, for example, power of the electronic device 1601. According to an embodiment, a power management integrated circuit (PMIC) a charger IC, or a battery or fuel gauge may be included in the power management module 1695. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, a rectifier, or the like. The battery gauge may measure, for example, a remaining capacity of the battery 1696 and a voltage, current or temperature thereof while the battery is charged. The battery 1696 may include, for example, a rechargeable battery or a solar battery.

The indicator 1697 may display a specific state of the electronic device 1601 or a part thereof (e.g., the processor 1610), such as a booting state, a message state, a charging state, and the like. The motor 1698 may convert an electrical signal into a mechanical vibration and may generate a vibration effect, a haptic effect, or the like. Even though not illustrated, a processing device (e.g., a GPU) for supporting a mobile TV may be included in the electronic device 1601. The processing device for supporting a mobile TV may process media data according to the standards of digital multimedia broadcasting (DMB), digital video broadcasting (DVB), MediaFlo™, or the like.

Each of the above-mentioned elements may be configured with one or more components, and the names of the elements may be changed according to the type of the electronic device. The electronic device according to various embodiments may include at least one of the above-mentioned elements, and some elements may be omitted or other additional elements may be added. Furthermore, some of the elements of the electronic device according to various embodiments may be combined with each other so as to form one entity, so that the functions of the elements may be performed in the same manner as before the combination.

Figure 17:
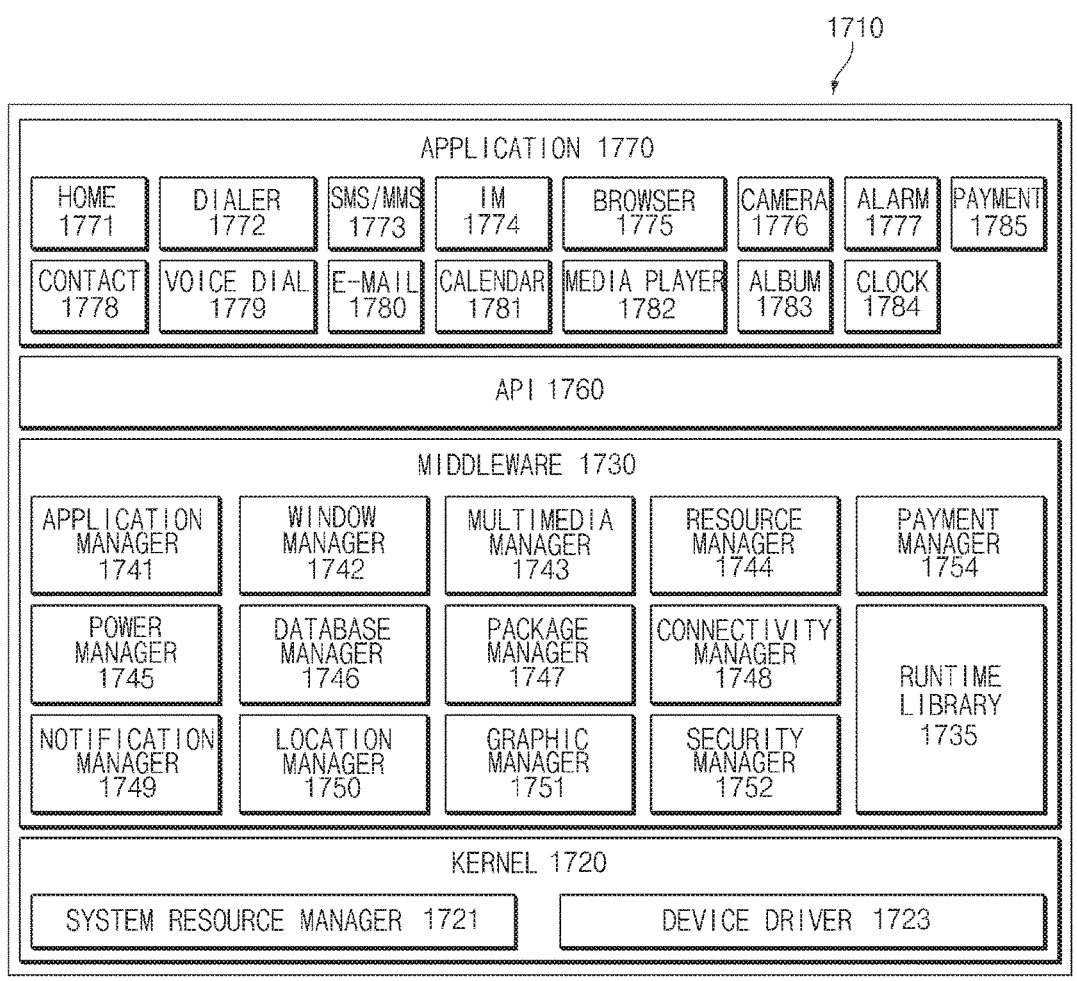
FIG. 17 illustrates a block diagram of a program module according to various embodiments.

FIG. 17 is a block diagram of a program module according to various embodiments. According to an embodiment, a program module 1710 (e.g., the program 140) may include an operating system (OS) to control resources associated with an electronic device (e.g., the electronic device 101) and/or diverse applications (e.g., the application program 147) driven on the OS. The OS may be, for example, android, iOS, windows, symbian, tizen, or bada.

The program module 1710 may include a kernel 1720, a middleware 1730, an application programming interface (API) 1760, and/or an application 1770. At least a part of the program module 1710 may be preloaded on an electronic device or may be downloadable from an external electronic device (e.g., the external device 102, and the like).

The kernel 1720 (e.g., the kernel 141) may include, for example, a system resource manager 1721 and/or a device driver 1723. The system resource manager 1721 may perform control, allocation, or retrieval of system resources. According to an embodiment, the system resource manager 1721 may include a process managing part, a memory managing part, or a file system managing part. The device driver 1723 may include, for example, a display driver, a camera driver, a Bluetooth driver, a shared memory driver, an USB driver, a keypad driver, a Wi-Fi driver, an audio driver, or an inter-process communication (IPC) driver.

The middleware 1730 may provide, for example, a function which the application 1770 needs in common, or may provide diverse functions to the application 1770 through the API 1760 to allow the application 1770 to efficiently use limited system resources of the electronic device. According to an embodiment, the middleware 1730 (e.g., the middleware 143) may include at least one of a runtime library 1735, an application manager 1741, a window manager 1742, a multimedia manager 1743, a resource manager 1744, a power manager 1745, a database manager 1746, a package manager 1747, a connectivity manager 1748, a notification manager 1749, a location manager 1750, a graphic manager 1751, or a security manager 1752.

The runtime library 1735 may include, for example, a library module which is used by a compiler to add a new function through a programming language while the application 1770 is being executed. The runtime library 1735 may perform input/output management, memory management, or capacities about arithmetic functions.

The application manager 1741 may manage, for example, a life cycle of at least one application of the application 1770. The window manager 1742 may manage a GUI resource which is used in a screen. The multimedia manager 1743 may identify a format used for playing diverse media files and may perform encoding or decoding of media files by using a codec suitable for the format. The resource manager 1744 may manage resources such as a storage space, memory, or source code of at least one application of the application 1770.

The power manager 1745 may operate, for example, with a basic input/output system (BIOS) to manage a battery or power and may provide power information for an operation of an electronic device. The database manager 1746 may generate, search for, or modify database which is to be used in at least one application of the application 1770. The package manager 1747 may install or update an application which is distributed in the form of a package file.

The connectivity manager 1748 may manage, for example, wireless connection such as Wi-Fi or Bluetooth. The notification manager 1749 may display or notify an event such as arrival message, appointment, or proximity notification in a mode that does not disturb a user. The location manager 1750 may manage location information of an electronic device. The graphic manager 1751 may manage a graphic effect that is provided to a user or manage a user interface relevant thereto. The security manager 1752 may provide a general security function used for system security or user authentication. According to an embodiment, in the case where an electronic device (e.g., the electronic device 101) includes a telephony function, the middleware 1730 may further includes a telephony manager for managing a voice or video call function of the electronic device.

The middleware 1730 may include a middleware module that combines diverse functions of the above-described elements. The middleware 1730 may provide a module specialized to each OS kind to provide differentiated functions. Additionally, the middleware 1730 may remove a part of the preexisting elements, dynamically, or may add a new element thereto.

The API 1760 (e.g., the API 145) may be, for example, a set of programming functions and may be provided with a configuration which is variable depending on an OS. For example, in the case where an OS is the android or the iOS, it may be permissible to provide one API set per platform. In the case where an OS is the tizen, it may be permissible to provide two or more API sets per platform.

The application 1770 (e.g., the application program 147) may include, for example, one or more applications capable of providing functions for a home 1771, a dialer 1772, an SMS/MMS 1773, an instant message (IM) 1774, a browser 1775, a camera 1776, an alarm 1777, a contact 1778, a voice dial 1779, an e-mail 1780, a calendar 1781, a media player 1782, an album 1783, and a clock 1784, or for offering health care (e.g., measuring an exercise quantity or blood sugar) or environment information (e.g., atmospheric pressure, humidity, or temperature).

According to an embodiment, the application 1770 may include an application (hereinafter referred to as "information exchanging application" for descriptive convenience) to support information exchange between the electronic device (e.g., the electronic device 101) and an external electronic device (e.g., the electronic device 102 or 104). The information exchanging application may include, for example, a notification relay application for transmitting specific information to the external electronic device, or a device management application for managing the external electronic device.

For example, the notification relay application may include a function of transmitting notification information, which arise from other applications (e.g., applications for SMS/MMS, e-mail, health care, or environmental information), to an external electronic device (e.g., the electronic device 102 or 104). Additionally, the notification relay application may receive, for example, notification information from an external electronic device and provide the notification information to a user.

The device management application may manage (e.g., install, delete, or update), for example, at least one function (e.g., turn-on/turn-off of an external electronic device itself (or a part of components) or adjustment of brightness (or resolution) of a display) of an external electronic device (e.g., the electronic device 102) which communicates with the electronic device, an application running in the external electronic device, or a service (e.g., a call service, a message service, or the like) provided from the external electronic device.

According to an embodiment, the application 1770 may include an application (e.g., a health care application of a mobile medical device, and the like) which is assigned in accordance with an attribute of the external electronic device (e.g., the electronic device 102). According to an embodiment, the application 1770 may include an application which is received from an external electronic device (e.g., the electronic device 102). According to an embodiment, the application 1770 may include a preloaded application or a third party application which is downloadable from a server. The element titles of the program module 1710 according to the embodiment may be modifiable depending on kinds of OSs.

According to various embodiments, at least a part of the program module 1710 may be implemented by software, firmware, hardware, or a combination of two or more thereof. At least a portion of the program module 1710 may be implemented (e.g., executed), for example, by the processor (e.g., the processor 120). At least a portion of the program module 1710 may include, for example, a module, a program, a routine, sets of instructions, or a process for performing one or more functions.

The term "module" used in this disclosure may represent, for example, a unit including one or more combinations of hardware, software and firmware. For example, the term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a portion of an apparatus (e.g., modules or functions thereof) or a method (e.g., operations) according to various embodiments may be, for example, implemented by instructions stored in a computer-readable storage media in the form of a program module. The instruction, when executed by a processor (e.g., the processor 120), may cause the one or more processors to perform a function corresponding to the instruction. The computer-readable storage media, for example, may be the memory 130.

The computer-readable storage media according to various embodiments may store a program for executing an operation in which a communication module receives an application package from an external device and provides the application package to a normal module of a processor, an operation in which the normal module determines whether a secure application is included in at least a portion of the application package, and an operation in which the secure module of the processor installs the secure application in the secure module or in a memory associated with the secure module.

The computer-readable storage media may include a hard disk, a floppy disk, a magnetic media (e.g., a magnetic tape), an optical media (e.g., a compact disc read only memory (CD-ROM) and a digital versatile disc (DVD)), a magneto-optical media (e.g., a floptical disk), and hardware devices (e.g., a read only memory (ROM), a random access memory (RAM), or a flash memory). Also, a program instruction may include not only a mechanical code such as things generated by a compiler but also a high-level language code executable on a computer using an interpreter. The above-mentioned hardware devices may be configured to operate as one or more software modules to perform operations according to various embodiments, and vice versa.

Modules or program modules according to various embodiments may include at least one or more of the above-mentioned elements, some of the above-mentioned elements may be omitted, or other additional elements may be further included therein. Operations executed by modules, program modules, or other elements according to various embodiments may be executed by a successive method, a parallel method, a repeated method, or a heuristic method. Also, a part of operations may be executed in different sequences, omitted, or other operations may be added.

According to various embodiments, an electronic device includes a processor, a memory functionally connected to the processor to store data, a moving part configured to transmit power for moving the electronic device, a camera module configured to photograph a periphery of the electronic device and a sensor module configured to recognize a peripheral situation of the electronic device, wherein the processor is configured to receive a request for setting a schedule, from at least one user, store identification information and schedule execution information on the user in the memory, track a target user of the schedule by using the camera module or the sensor module and if an alarm execution time included in the schedule execution information comes, provide an alarm related to the schedule to the target user in a specific manner.

According to various embodiments, the processor receives a request for setting a schedule on a second user, from a first user.

According to various embodiments, the processor stores information on an attribute of the schedule, and an alarm execution time and an alarm execution site for the schedule in the memory.

According to various embodiments, the processor identifies key information of the user that is stored in advance, based on the identification information, and stores the identified key information together with the schedule.

According to various embodiments, the processor updates an alarm execution site included in the schedule execution information, if the target user moves before the alarm execution time.

According to various embodiments, the processor allows the electronic device to move to an alarm execution site included in the schedule execution information.

According to various embodiments, the processor allows the electronic device to move to the alarm execution site before a preset time from the alarm execution time or at the alarm execution time.

According to various embodiments, the processor collects recognition information on at least one user who is at the alarm execution site, and compares the collected recognition information and key information of the target user, which is stored in advance.

According to various embodiments, the processor adjusts an alarm execution time included in the schedule execution information, depending on an event.

According to various embodiments, the processor provides additional information related to the schedule to the target user if the target user recognizes the alarm.

According to various embodiments of the present disclosure, an efficiency of an electronic device (for example, a domestic robot device) that is used by a plurality of users, by providing an alarm in various manners based on the characteristics of the users.

According to various embodiments of the present disclosure, a user who is an alarm target may be targeted and be provided with an alarm, and a situation in which other users are disturbed by the alarm may be reduced.

According to various embodiments, the in-use efficiency and convenience of an electronic device may be improved by setting and managing alarm times for individuals through conjunction of individual schedule information and cloud information.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of outputting an alarm, the method being performed by an electronic device, the method comprising:
   receiving a request for setting a schedule, from a first user;
   storing identification information of the first user and schedule execution information;
   tracking a second user who is a target of the schedule by using a sensor module of the electronic device;
   when an alarm execution time included in the schedule execution information comes, moving to an alarm execution site for the schedule using a moving part of the electronic device; and
   providing an alarm related to the schedule to the second user in a specific manner,
   wherein the moving part includes at least one motor.

2. The method of claim 1, wherein the storing of the schedule execution information comprises:
   storing information on an attribute of the schedule, and the alarm execution time and the alarm execution site for the schedule.

3. The method of claim 1, wherein the storing of the schedule execution information comprises:
   identifying key information of the first user that is stored in advance, based on the identification information, and storing the identified key information together with the schedule.

4. The method of claim 1, wherein the tracking of the second user comprises:
   if the second user moves before the alarm execution time, updating the alarm execution site included in the schedule execution information.

5. The method of claim 1, wherein the identification information of the first user is identical to an identification information of the second user.

6. The method of claim 1, wherein the moving to the alarm execution site comprises:
   moving to the alarm execution site before a preset time from the alarm execution time or at the alarm execution time.

7. The method of claim 5, wherein the moving to the alarm execution site comprises:
   collecting recognition information on a third user who is at the alarm execution site; and
   comparing the collected recognition information and key information of the second user, that is stored in advance.

8. The method of claim 7, wherein the providing of the alarm comprises:
   if the alarm execution time comes, transmitting a signal that requests a peripheral device, that was set to interwork with the electronic device in advance, to generate an alarm.

9. The method of claim 1, wherein the providing of the alarm comprises:
   outputting a sound using a directional speaker or light in a form of a beam to the second user.

10. The method of claim 1, wherein the providing of the alarm comprises:
    recognizing a part of a body of the second user; and
    generating a stimulus to the part of the body.

11. The method of claim 1, further comprising:
    if the second user recognizes the alarm, providing additional information related to the schedule to the second user.

12. An electronic device comprising:
    a processor;
    a memory functionally connected to the processor to store data;
    a moving part configured to transmit power for moving the electronic device;
    a camera module configured to photograph a periphery of the electronic device; and
    a sensor module configured to recognize a peripheral situation of the electronic device,
    wherein the processor is configured to:

receive a request for setting a schedule, from a first user;
store identification information of the first user and schedule execution information in the memory;
track a second user who is a target of the schedule by using the camera module or the sensor module;
when an alarm execution time included in the schedule execution information comes, move to an alarm execution site for the schedule using the moving part; and
provide an alarm related to the schedule to the second user in a specific manner,
wherein the moving part includes at least one motor.

13. The electronic device of claim 12, wherein the processor stores information on an attribute of the schedule, and the alarm execution time and the alarm execution site for the schedule in the memory.

14. The electronic device of claim 12, wherein the processor identifies key information of the first user that is stored in advance, based on the identification information, and stores the identified key information together with the schedule.

15. The electronic device of claim 12, wherein the processor updates the alarm execution site included in the schedule execution information, if the second user moves before the alarm execution time.

16. The electronic device of claim 12, wherein the identification information of the first user is identical to an identification information of the second user.

17. The electronic device of claim 12, wherein the processor allows the electronic device to move to the alarm execution site before a preset time from the alarm execution time or at the alarm execution time.

18. The electronic device of claim 16, wherein the processor collects recognition information on a third user who is at the alarm execution site, and compares the collected recognition information and key information of the second user, that is stored in advance.

19. The electronic device of claim 12, wherein the processor adjusts the alarm execution time included in the schedule execution information, depending on an event.

20. The electronic device of claim 12, wherein the processor provides additional information related to the schedule to the second user if the second user recognizes the alarm.

* * * * *